United States Patent
Nonaka et al.

(10) Patent No.: US 8,160,111 B2
(45) Date of Patent: Apr. 17, 2012

(54) OPTICAL TRANSMISSION DEVICE, OPTICAL TRANSMISSION SYSTEM, AND BANDWIDTH CONTROL METHOD

(75) Inventors: Ayumu Nonaka, Fukuoka (JP); Yuji Shimada, Fukuoka (JP); Hideo Kuroda, Fukuoka (JP); Koji Nekoda, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 812 days.

(21) Appl. No.: 12/253,591

(22) Filed: Oct. 17, 2008

(65) Prior Publication Data

US 2009/0169218 A1 Jul. 2, 2009

(30) Foreign Application Priority Data

Nov. 14, 2007 (JP) ................................. 2007-296044

(51) Int. Cl.
*H04J 3/06* (2006.01)
(52) U.S. Cl. ........................................ 370/503; 375/356
(58) Field of Classification Search .......... 370/229–235, 370/503–512, 516–520; 375/356, 363–364, 375/368
See application file for complete search history.

(56) References Cited

U.S. PATENT DOCUMENTS

| 7,042,904 | B2 | 5/2006 | Kamiya |
| 7,333,478 | B2* | 2/2008 | Wiebe ........................... 370/352 |
| 7,472,318 | B2* | 12/2008 | Fan et al. ................... 370/236.1 |
| 2002/0129379 | A1* | 9/2002 | Levinson et al. ............. 725/129 |
| 2003/0074449 | A1* | 4/2003 | Smith et al. ................... 709/226 |

FOREIGN PATENT DOCUMENTS

JP 2003-188843 7/2003

* cited by examiner

*Primary Examiner* — Ricky Ngo
*Assistant Examiner* — Phuongchau B Nguyen
(74) *Attorney, Agent, or Firm* — Staas & Halsey LLP

(57) ABSTRACT

A system and method of transmitting client data encoded according to an 8B/10B encoding between a client side and an optical communication network side, including inserting padding signals in an amount corresponding to a rate difference between a clock on the client side and a clock in the optical transmission device and controlling a clock to be used as a reference in transmitting the client data to synchronize with a clock having been used as a reference in transmitting the client data on the basis of a ratio of padding signals having been inserted in the client data.

9 Claims, 17 Drawing Sheets

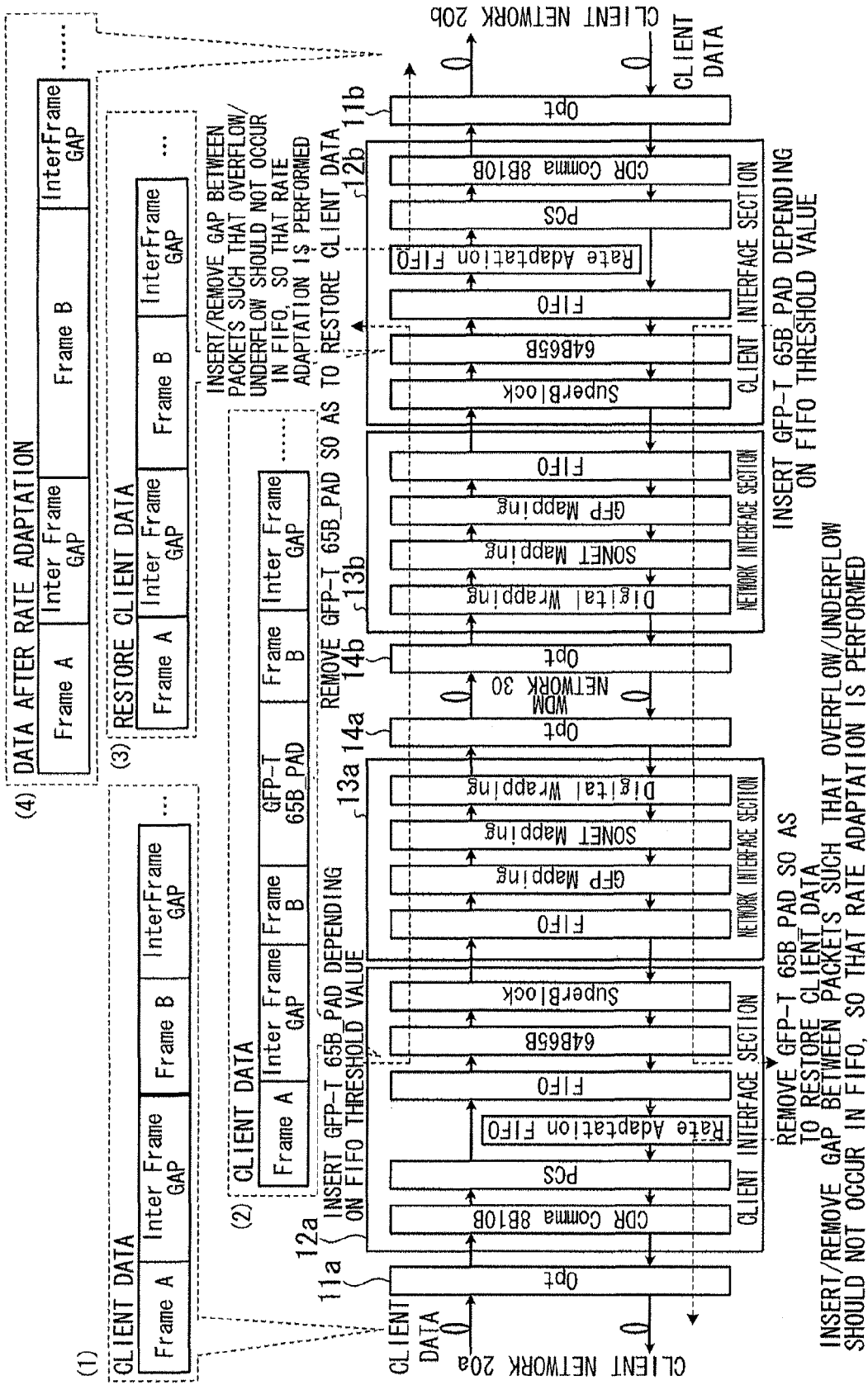

OPTICAL TRANSMISSION DEVICE, OPTICAL TRANSMISSION SYSTEM, AND BANDWIDTH CONTROL METHOD

CROSS-REFERENCE TO RELATED APPLICATIONS

This application is based upon and claims the benefit of priority of the prior Japanese Application No. 2007-296044, filed on Nov. 14, 2007, the entire contents of which are incorporated herein by reference.

BACKGROUND

1. Field

The invention relates to an optical transmission device, an optical transmission system, and a bandwidth control method for transmitting client data encoded according to an 8B/10B encoding system, between a client side and an optical communication network side. In particular, the invention relates to an optical transmission device, an optical transmission system, and a bandwidth control method for equilibrating the bandwidth of client data and thereby avoiding an occurrence of frame discard on the destination client side, and transferring the client data transparently.

2. Description of the Related Art

In recent years, in optical transmission systems employing optical communication networks, optical transmission devices are used that demultiplex a plurality of client signals according to an 8B/10B encoding system and that transmit physical layer data in a framed form based on a frame format technique such as GFP (Generic Framing Procedure), SONET (Synchronous Optical NETwork), and SDH (Synchronous Digital Hierarchy) (see, for example, Patent Document 1).

FIG. 14 is a diagram showing an example of a typical optical transmission system. As shown in this figure, the optical transmission system is constructed, for example, such that a plurality of optical transmission devices are connected to each other in a ring shape via an optical communication network (Network) and client networks each containing a plurality of client devices are connected to each optical transmission device.

Here, client signals to be transmitted and received between the individual client devices are encoded according to an 8B/10B encoding system, then multiplexed by an optical transmission device, and then transmitted through the optical communication network. In such an optical transmission system, it is desired that in the optical transmission devices, the client signal can be transferred transparently in the intact form of physical layer data.

Specifically, requirements are that: (1) setup information is transparently transferred between client devices so that an optimal operation mode is set up between the client devices; (2) failure information is transparently transferred between client devices so that switching is performed normally at the time of occurrence of a failure; and (3) frames are transparently transferred so that even when header information or the like is used in accordance with a non-standard specification, a network is constructed without the necessity that the individual client devices should recognize the presence of optical transmission devices.

In a case that a client signal is to be transparently transferred to a counterpart client device in the intact form of physical layer data, when a client signal having a frequency deviation is transparently transferred, the frequency deviation easily causes underflow or overflow in a FIFO (First In First Out) buffer (simply referred to as "FIFO", hereinafter) in a transmitting section of a client interface section.

Thus, in general, the optical transmission device performs "Rate Adaptation" in which an inter frame gap (Inter Frame GAP) is inserted into the signal to be transmitted to the client device or alternatively an IFG is deleted so that the rate is controlled.

Here, rate adaptation in a typical optical transmission system is described below with reference to FIGS. 15, 16, and 17. FIGS. 15, 16, and 17 are parts (1), (2), and (3) of a diagram describing rate adaptation in a typical optical transmission system. These figures show a case that WDM (Wavelength Division Multiplexing) transmission devices are employed as optical transmission devices.

For example, as shown in FIG. 15, an optical transmission system is described in which a plurality of WDM networks 30 (Network) each constructed from a plurality of WDM transmission devices (WDM SYSTEM Term) are connected in a tandem configuration, and in which a client network 20a is connected to a WDM transmission device 10a located at a starting point while a client network 20b is connected to a WDM transmission device 10b located at an ending point.

FIG. 16 shows the WDM transmission devices 10a and 10b shown in FIG. 15. Each of the WDM transmission devices 10a and 10b is an optical transmission device employing an 8B/10B encoding system. Thus, each device multiplexes client signals to be exchanged between client devices connected to the client networks 20a and 20b, and then transmits the signals through the WDM network 30.

As shown in FIG. 16, the WDM transmission device 10a has a client interface optical module section (Opt.MDL) 11a, a client interface section (ClientINF) 12a, a network interface section (NetworkINF) 13a, and a network interface optical module section (Opt.MDL) 14a.

The client interface optical module section 11a converts a client signal exchanged between the client network 20a and the WDM transmission device 10a, from an optical signal into an electric signal or alternatively from an electric signal into an optical signal. The client interface section (ClientINF) 12a has a FIFO for accumulating client signals, and encodes the client signals according to an 8B/10B encoding system.

The network interface section 13a performs processing concerning the framing of a client signal like digital wrapping. The network interface optical module section 14a converts a client signal exchanged between the WDM network 30 and the WDM transmission device 10a, from an optical signal into an electric signal or alternatively from an electric signal into an optical signal.

Similarly, the WDM transmission device 10b has a client interface optical module section (Opt.MDL) 11b, a client interface section (ClientINF) 12b, a network interface section (NetworkINF) 13b, and a network interface optical module section (Opt.MDL) 14b.

Further, transmission of a client signal performed by the WDM transmission devices 10a and 10b is described below in detail with reference to FIG. 17. For example, a case is described that a client signal is transferred from the client network 20a to the client network 20b.

First, when a client signal is transmitted through the client network 20a, on the WDM transmission device 10a side, the client interface section 12a receives the client signal through the client interface optical module section 11a.

Here, as shown in part (1) of the figure, the client signal (Client data) transmitted through the client network 20a contains a frame A (Frame A), a frame B (Frame B), and the like. Then, an inter frame gap (InterFrameGAP) is inserted between the individual frames.

When receiving the client signal, the client interface section 12a accumulates the client signal temporarily into the FIFO, then reads the signal sequentially, and then transfers the signal to the network interface section 13a.

Here, as shown in part (2) of the figure, when the amount of data accumulated in the FIFO goes below or is at a predetermined threshold value, the client interface section 12a inserts a padding signal into the frame contained in the client signal, and then transfers the client signal to the network interface section 13a. This padding signal may be, for example, 65B_PAD of GFP-T (Generic Framing Procedure-Transparent) according to ITU-T (International Telecommunication Union-Telecommunication standardization sector) G.7041 standard.

When the client signal is transferred from the client interface section 12a, the network interface section 13a transmits the client signal through the network interface optical module section 14a to the WDM network 30.

On the other hand, when the client signal is transmitted through the WDM network 30, on the WDM transmission device 10b side, the network interface section 13b receives the client signal through the network interface optical module section 14b. When receiving the client signal, the network interface section 13b transfers the received client signal to the client interface section 12b.

When the client signal is transferred from the network interface section 13b, as shown in part (3) of the figure, the client interface section 12b deletes the padding signal so as to restore the client signal, and then accumulates the restored client signal temporarily into the FIFO.

Here, as shown in part (4) of the figure, in order to prevent overflow or underflow in the FIFO, the client interface section 12b performs rate adaptation in which an inter frame gap is inserted into or deleted from the client signal. After the rate adaptation, the client interface section 12b transmits the client signal through the client interface optical module section 11b to the client network 20b.

For example, when a network is constructed by employing a Gigabit Ethernet (registered trademark) (referred to as "GbE", hereinafter) according to IEEE (Institute of Electrical and Electronics Engineers) 802.3 standard, a frequency deviation is ±100 ppm and an idle code (Idle Code) and a C1C2 code for auto-negotiation (C1C2 Code) correspond to an inter frame gap.

[Patent Document 1] Patent No. 3690516 (Japanese Laid-Open Patent Publication No. 2003-188843)

Nevertheless, when rate adaptation is performed, the bandwidth of the frame of the physical data transmitted to the client device fluctuates to an extent of 100% or greater relative to the frequency deviation. This causes a problem that when the optical network side frequency of the optical transmission device is higher than that of the client signal and hence the inter frame gap of the input signal reaches a minimum value having been set forth for each client device according to an 8B/10B encoding system, the processing load increases in the counterpart client device so that frame discard occurs. Then, the frame discard causes a problem that transparent transfer of a client signal in the intact form of physical layer data cannot be performed.

For example, in the case of a GbE employing an 8B/10B encoding system, the inter frame gap of the client signal is greater than or equal to 96 ns (12 bytes) after 8-bit conversion according to 8B/10B encoding. However, when a frequency deviation occurs, the inter frame gap may be reduced down to 64 ns (8 bytes) according to the definition of IEEE802.3 or ITU-T G.7041 standard.

Thus, between the client devices, even when the bandwidth is changed in a state that the length of the inter frame gap is reduced to a value near the minimum value of 64 ns (8 bytes), the client signal need be transparently transferred without the occurrence of frame discard.

In particular, as shown in FIG. 15, in the optical transmission system in which a plurality of optical communication networks each constructed from a plurality of WDM transmission devices are connected in a tandem configuration, when rate adaptation is performed by the individual WDM transmission devices, their frequency deviation causes a fluctuation of 100% or greater in the bandwidth of the frame of the physical layer data transmitted to a client device at far end (in GbE, the bandwidth becomes 100% when the inter frame gap is 96 ns).

At that time, the inter frame gap reaches a value near a minimum value (64 ns in the case of GbE) set forth for each client device according to an 8B/10B encoding system. A larger value of the number of tandem stages results in a stronger tendency that the frequency deviation between the individual devices causes a bandwidth of 100% or greater in the frame of the physical layer data between client devices at far ends.

As such, when the bandwidth is 100% or greater or alternatively its fluctuation is 100% or greater, in a client device that requires a large amount of time in the frame processing for the physical layer data, the processing load increases so that frame discard occurs. This causes a problem that transparent transfer of a client signal in the intact form of physical layer data cannot be performed.

SUMMARY

The invention has been devised in order to resolve the above-mentioned and other problems. An object of the invention is to provide an optical transmission device, an optical transmission system, a bandwidth control method, and a bandwidth control program for equilibrating a bandwidth of client data so as to avoid occurrence of frame discard on the destination client side, and thereby achieving transparent transfer of the client data.

The disclosed optical transmission device includes transmitting client data encoded according to an 8B/10B encoding, between a client side and an optical communication network side, and inserting padding signals into the client data, when client data received from the client side is to be transmitted to the optical communication network side. The padding signals are in an amount corresponding to a rate difference between a clock on the client side and a clock in the optical transmission device faster than the clock of the client side. When client data received from another optical transmission device connected with the optical communication network side is to be transmitted to the client side, control is performed such that a clock to be used as a reference in transmitting the client data is synchronized with a clock having been used as a reference in transmitting the client data, based on a ratio of padding signals having been inserted in the client data.

Additional objects and advantages of the embodiment will be set forth in part in the description which follows, and in part will be obvious from the description, or may be learned by practice of the invention.

The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

These and/or other aspects and advantages will become apparent and more readily appreciated from the following description of the embodiments, taken in conjunction with the accompanying drawings of which:

FIG. 17 is part (3) of a diagram describing rate adaptation in a typical optical transmission system.

DETAILED DESCRIPTION OF EMBODIMENTS

Figure 1:
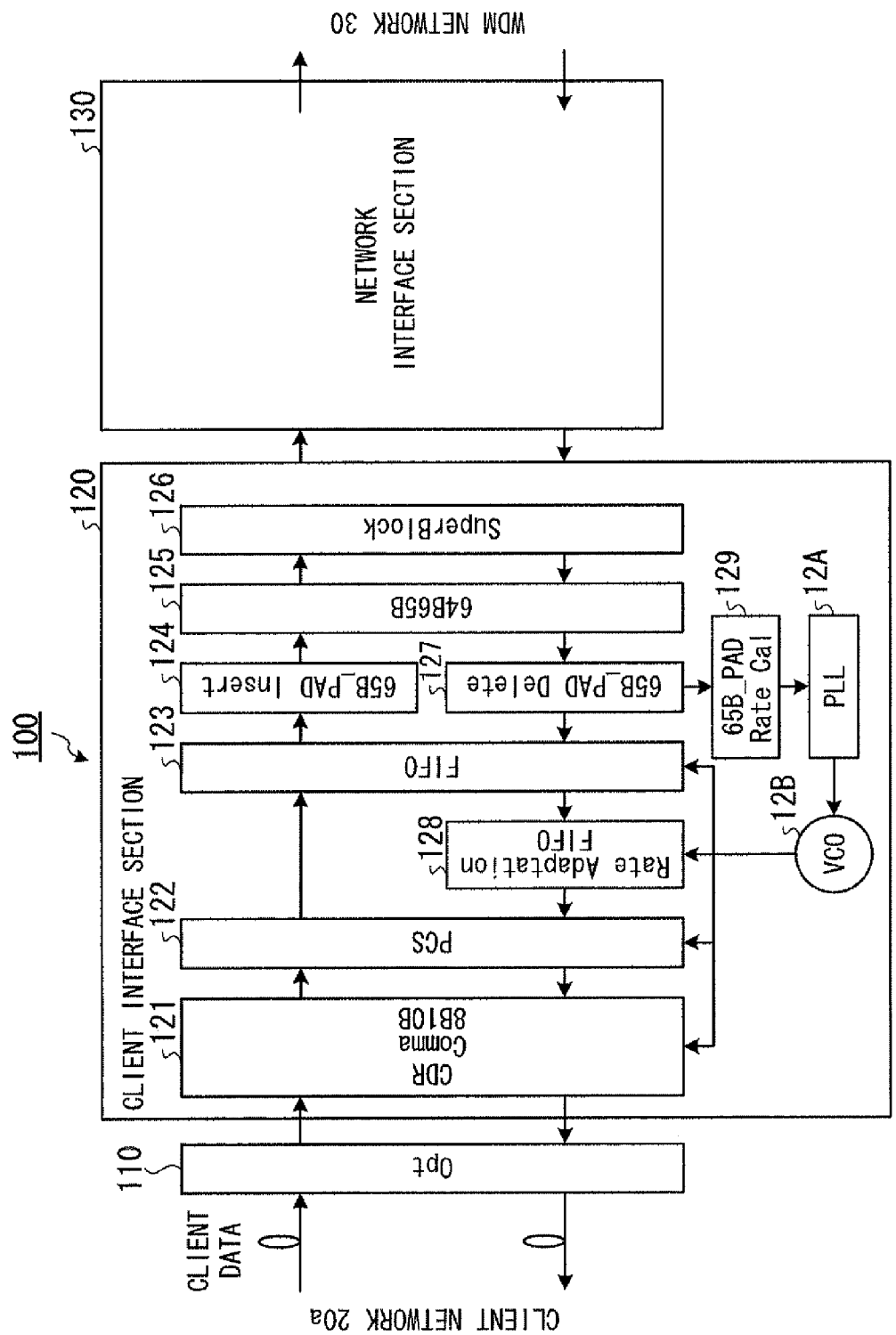
FIG. 1 is a diagram showing a configuration of a WDM transmission device according to Embodiment 1 of the invention.

Reference will now be made in detail to the embodiments, examples of which are illustrated in the accompanying drawings, wherein like reference numerals refer to the like elements throughout. The embodiments are described below to explain the present invention by referring to the figures.

Preferably embodiments of an optical transmission device, an optical transmission system, a bandwidth control method, and a bandwidth control program according to the invention are described below in detail with reference to the accompanying drawings. Here, these embodiments are described for a case that the invention is applied to an optical transmission system constructed from WDM transmission devices shown in FIGS. 15, 16, and 17.

First, the configuration of a WDM transmission device according to Embodiment 1 of the invention is described below. FIG. 1 is a diagram showing the configuration of a WDM transmission device according to the Embodiment 1. The WDM transmission device 100 according to the Embodiment 1 corresponds to the WDM transmission device 10a shown in FIGS. 16 and 17. Then, as shown in this figure, the WDM transmission device 100 is connected with a client network 20a (client side) to which a plurality of client devices are connected; and a WDM network 30 (WDM network side) to which other WDM transmission devices are connected.

Here, the client network 20a is, for example, a network for transferring client data encoded in accordance with an 8B/10B encoding system, like GbE according to IEEE802.3 standard, Fibre Channel according to ANSI (American National Standard Institute) X3.23 standard, and SBCON (Single-Byte command code sets CONnection) according to ANSI X3.296 standard.

The WDM transmission device 100 has a client interface optical module section (Opt) 110, a client interface section 120, a network interface section 130, and a network interface optical module section (not shown).

The client interface optical module section 110 is a processing section for converting from an optical signal into an electric signal the physical layer data transmitted from the client side, and converting from an electric signal into an optical signal the data transmitted to the client side.

The client interface section 120 is a processing section that has a FIFO for accumulating data transmitted from the client side and encodes the client signal according to an 8B/10B encoding system. The client interface section 120 has a data extraction section (CDR/Comma/8B10B) 121, a code synchronization section (PCS) 122, a clock conversion FIFO (FIFO) 123, a padding signal insertion section 124, a 64B/65B encoding section (64B65B) 125, a superblock generation recognition section (SuperBlock) 126, a padding signal removal section (65B_PAD Delete) 127, a rate adaptation section (Rate Adaptation/FIFO) 128, a padding signal rate calculation section (65B_PAD Rate Cal) 129, a frequency synchronization control section (PLL) 12A, and a voltage controlled oscillator (VCO) 12B.

Here, the flow of physical layer data is described below. Physical layer data transmitted from the client side is transferred to the WDM network 30 side via individual sections including of the client interface optical module section 110, the data extraction section 121, the code synchronization section 122, the clock conversion FIFO 123, the padding signal insertion section (65B_PAD Insert) 124, the 64B/65B encoding section 125, the superblock generation recognition section 126, and the network interface section 130 in this order.

On the other hand, physical layer data transmitted from the WDM network 30 side is transferred to the client side via individual sections including the network interface section 130, the superblock generation recognition section 126, the padding signal removal section 127, the clock conversion FIFO 123, the rate adaptation section 128, the code synchronization section 122, and the data extraction section 121 in this order.

Then, in the WDM transmission device 100 according to the Embodiment 1, the padding signal rate calculation section 129, the frequency synchronization control section 12A, and the voltage controlled oscillator 12B control the frequency of the clock used as a reference at the time of transmitting physical layer data from the WDM transmission device 100 to the client network 20a side, on the basis of the ratio of padding signals contained in the physical layer data.

In typical, the padding signal inserted into the physical layer data is treated as redundant data to be discarded in the counterpart WDM transmission device. However, in the Embodiment 1, the padding signal is utilized so that bandwidth control is realized at the time of transmitting physical layer data.

The individual functional sections are described below in detail.

The data extraction section 121 is a processing section for extracting a clock signal and a data signal from physical layer data transmitted from the client network 20a side. Specifically, when receiving physical layer data through the client interface optical module section 110, the data extraction section 121 extracts a clock signal and a data signal from the received physical layer data.

Further, the data extraction section 121 detects commas in the extracted data signal, and then rearranges the bit string. Here, the comma indicates a special bit pattern that is contained in the physical layer data transmitted from the client device, and that is never generated in a serial bit sequence (a transmission path) even when other code words are received in what kind of sequence. The comma is contained in special code words K28.5.

Further, the data extraction section 121 encodes 10-bit physical layer data transmitted from the client side, into 8-bit data in accordance with an 8B/10B encoding system. On the other hand, as for data to be sent to a client device, the data extraction section 121 encodes the 8-bit data into 10-bit physical layer data. The data encoded here is composed of data code words of 256 kinds expressed in 8 bits and special code words that indicate an idle state (no-communication state) of a transmission path and a separation in the data.

The code synchronization section 122 is a processing section for establishing synchronization between the devices on the basis of an idle code indicating a state that a transmission path on the client side is available.

The clock conversion FIFO 123 is a FIFO buffer for converting the physical layer data transmitted from the client network 20a onto the clock in the WDM transmission device 100. On the other hand, the clock conversion FIFO 123 is used also when the data to be sent to the client device is converted from the clock in the WDM transmission device 100 to the clock for transmission to a client device.

The padding signal insertion section 124 is a processing section for reading the physical layer data accumulated in the clock conversion FIFO 123 and then transferring the data to the 64B/65B encoding section 125. Here, when the amount of data in the clock conversion FIFO 123 goes below or is at a predetermined threshold value, the padding signal insertion section 124 inserts a padding signal (i.e., a 65B_PAD of GFP-T) into the frame of physical layer data, and transfers the physical layer data to the 64B/65B encoding section 125.

Here, the physical layer data to be transferred to the 64B/65B encoding section 125 is transmitted through the WDM network 30, and then transmitted together with the padding signal to the client interface section of the counterpart WDM transmission device.

The 64B/65B encoding section 125 is a processing section for encoding into 65-bit data the data encoded by the data extraction section 121. Specifically, for the purpose of transparent transfer of the physical layer data received from the client network 20a, first, the 64B/65B encoding section 125 divides, into 8-bit units, 8-bit data encoded from 10-bit physical layer data by the data extraction section 121. Then, the 64B/65B encoding section 125 combines individual eight pieces of divided data so as to generate 64-bit data.

Then, the 64B/65B encoding section 125 combines the generated 64-bit data with a 1-bit flag indicating whether the physical layer data transmitted from the client network 20a is a data code word or a special code word, so as to encode the data into 65-bit data. This method of encoding is performed, for example, in accordance with a 64B/65B encoding system defined in ITU-T G.7041 standard.

The superblock generation recognition section 126 combines, into 1-block (65-byte) data, eight data pieces each encoded into 65 bits by the 64B/65B encoding section 125. Then, the superblock generation recognition section 126 combines the 1-block data with a 2-byte CRC (Cyclic Redundancy Check) so as to generate 67-byte data.

The 67-byte data generated here is mapped into the payload of GFP by the network interface section. This mapping is performed by a framing technique, for example, according to ITU-T G.7041.

The padding signal removal section 127 is a processing section for removing a padding signal (i.e., a 65B_PAD of GFP-T) inserted in the physical layer data transmitted from the counterpart WDM transmission device on the WDM network 30 side.

The rate adaptation section 128 is a processing section for performing rate adaptation on the physical layer data to be transmitted to the client network 20a. The rate adaptation section 128 has a rate adaptation FIFO for accumulating the rate-adapted physical layer data.

Specifically, in order that underflow or overflow should not occur in the clock conversion FIFO 123 and the rate adaptation FIFO, the rate adaptation section 128 inserts an inter frame gap into the physical layer data transmitted to the client network 20a, or alternatively deletes an inter frame from the physical layer data.

For example, when the physical layer data exchanged to and from the client network 20a is physical layer data of GbE, an idle code in the inter frame and a C1C2 code for Auto Negotiation are targets of insertion/deletion.

The padding signal rate calculation section 129 is a processing section for calculating a ratio of padding signals contained in the physical layer data transmitted from the counterpart WDM transmission device on the WDM network 30 side. This ratio of padding signals calculated here is referred to as "insertion rate", hereinafter.

Here, the padding signal rate calculation section 129 may adopt as the insertion rate a number of padding signals detected per unit time, or alternatively a number of padding signals contained in a predetermined number of frames.

The frequency synchronization control section 12A is a processing section for changing a voltage value inputted to the voltage controlled oscillator 12B described later in accordance with the insertion rate calculated by the padding signal rate calculation section 129, so as to control the clock used as a reference in transmitting the client signal.

Figure 2:
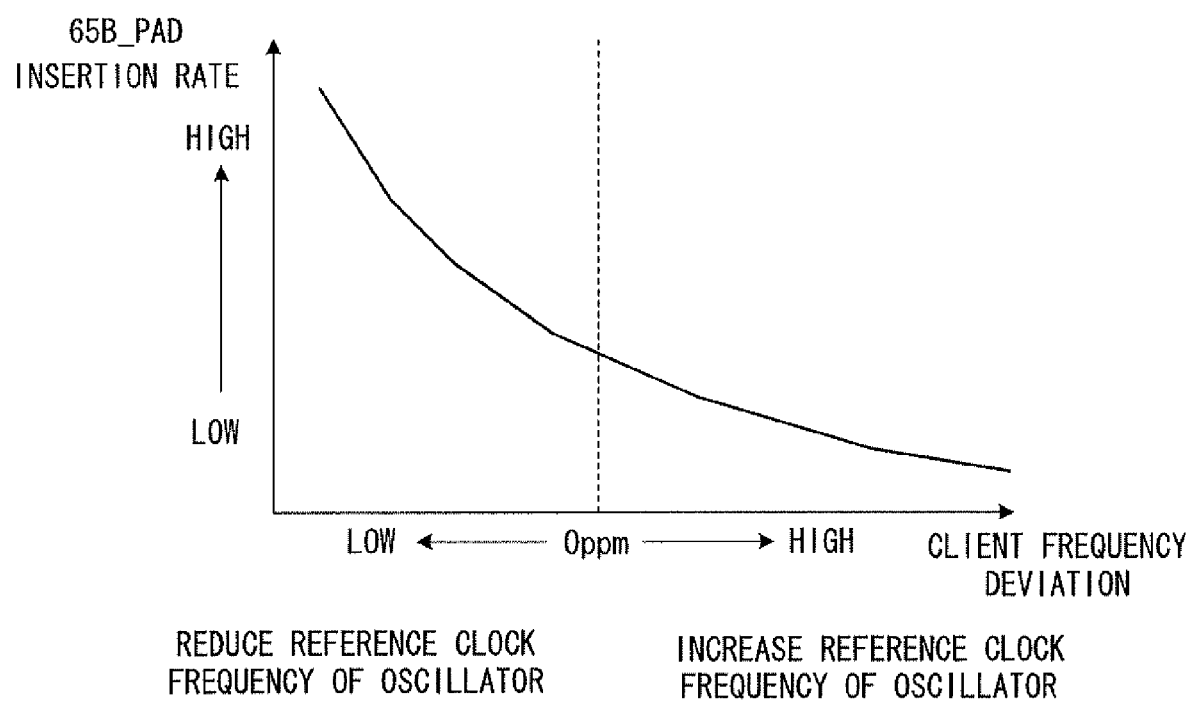
FIG. 2 is a diagram showing a relation between a frequency deviation in a client signal and an insertion rate of padding signals.

FIG. 2 is a diagram showing a relation between a frequency deviation in the client signal and a insertion rate of padding signals. As shown in this figure, when the frequency deviation in the client signal is high, physical layer data stored in the clock conversion FIFO 123 tends to increase, and hence an insertion rate of padding signals decreases. In contrast, when the frequency deviation in the client signal is low, physical layer data stored in the clock conversion FIFO 123 tends to decrease, and hence the insertion rate of padding signals increases.

Thus, when the insertion rate of padding signals is lower than a predetermined threshold value, the frequency synchronization control section 12A increases the voltage value inputted to the voltage controlled oscillator 12B so as to increase the frequency of the clock used as a reference in transmitting the client signal. In contrast, when the insertion rate of padding signals is higher than the predetermined threshold value, the frequency synchronization control section 12A reduces the voltage value inputted to the voltage controlled oscillator 12B so as to reduce the frequency of the clock used as a reference in transmitting the client signal.

The voltage controlled oscillator 128 is an oscillator for, in response to a change in the voltage applied on the control terminal, changing the frequency of the clock used as a reference for operation of the data extraction section 121, the code synchronization section 122, the clock conversion FIFO 123, and the rate adaptation section 128. When the frequency is adjusted in the clock used as a reference for operation of the data extraction section 121, the code synchronization section 122, the clock conversion FIFO 123, and the rate adaptation section 128, the frequency is controlled in the clock used as a reference in transmitting the client signal.

The network interface section 130 is a processing section for performing processing concerning the framing of data transmitted through the WDM network 30, like mapping of GFP form, mapping of SONET form, mapping of SDH form, mapping of OTN (Optical Transport Network) form, and digital wrapping.

Figure 3:
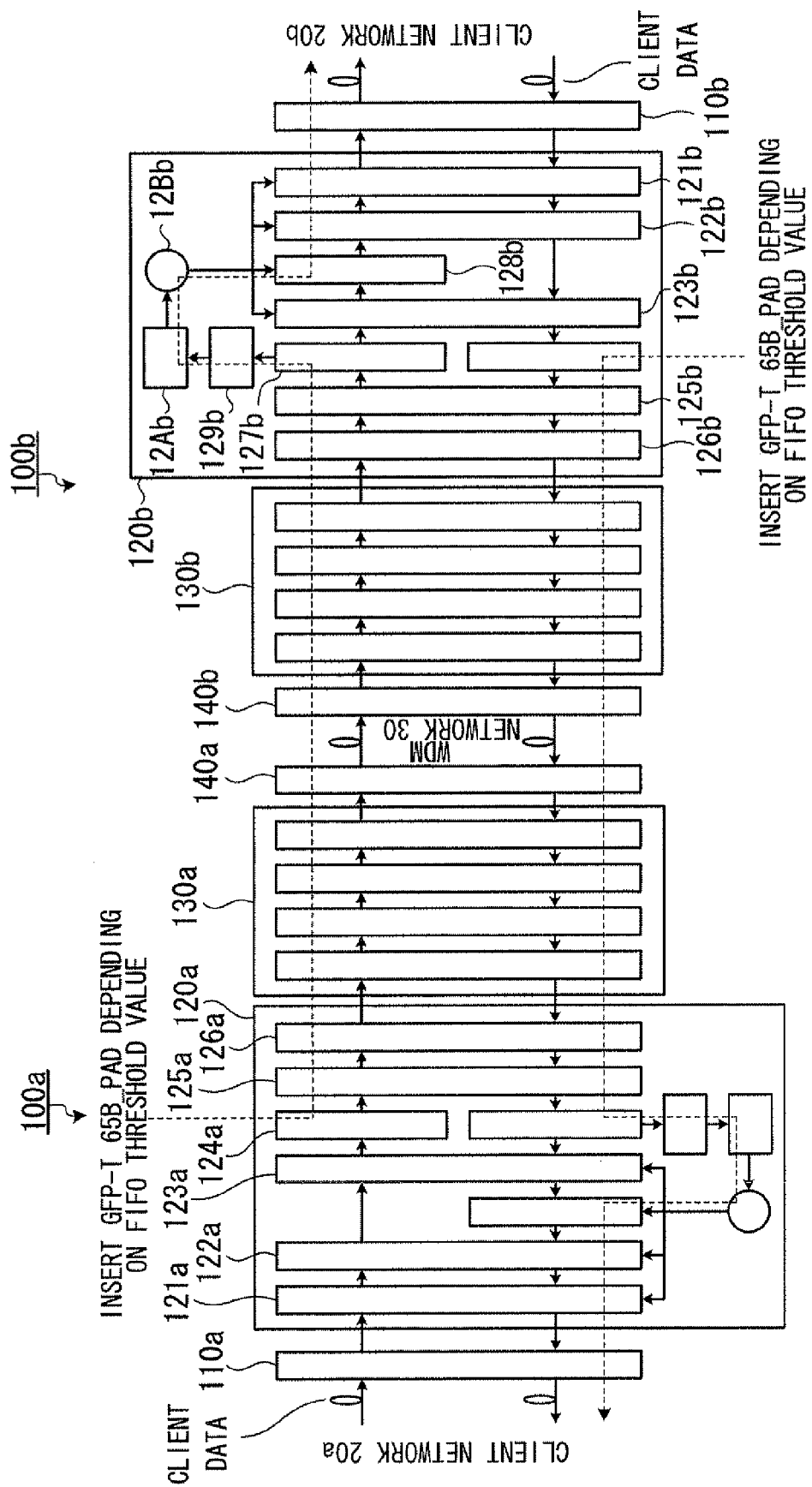
FIG. 3 is a diagram describing a flow of bandwidth control performed by WDM transmission devices according to Embodiment 1 of the invention.

Next, the flow of bandwidth control performed by the WDM transmission devices 100 according to the Embodiment 1 is described below. FIG. 3 is a diagram describing the flow of bandwidth control performed by the WDM transmission devices according to the Embodiment 1. Each of the WDM transmission devices 100a and 100b shown in this figure has a configuration similar to that of the WDM transmission device 100 shown in FIG. 1.

The WDM transmission devices 100a and 100b are connected to each other via the WDM network 30. Further, the WDM transmission device 100a is connected to the client network 20a, while the WDM transmission device 100b is connected to the client network 20b.

The following description is given for a case that the WDM transmission devices 100a and 100b respectively transfers and receives physical layer data transmitted from the client network 20a side to the client network 20b side.

First, in the WDM transmission device 10a, when physical layer data is transmitted from the client network 20a side, the client interface optical module section 110a receives the physical layer data, and then sends the received physical layer data to the client interface section 120a.

Then, in the client interface section 120a, the data extraction section 121a converts the physical layer data from a 10-bit form into an 8-bit form. Then, in synchronization with the clock on the client network 20a side, the code synchronization section 122a writes the physical layer data into the clock conversion FIFO 123a.

After that, in synchronization with the device clock sufficiently faster than the clock on the client network 20a side, the padding signal insertion section 124a reads the physical layer data from the clock conversion FIFO 123a, and then sends the read-out physical layer data to the 64B/65B encoding section 125a. Here, when the amount of data in the clock conversion FIFO 123a goes below or at a predetermined threshold value, the padding signal insertion section 124a inserts a padding signal into the frame of physical layer data, and then sends the physical layer data to the 64B/65B encoding section 125a.

Here, since the padding signal insertion section 124a performs readout in synchronization with the clock sufficiently faster than the clock used at the time that the physical layer data has been written into the clock conversion FIFO 123a, the insertion of a padding signal into the frame of physical layer data is performed independently of the frequency deviation in the client signal.

Then, the 64B/65B encoding section 125a converts the physical layer data into a 65-bit form. Then, the superblock generation recognition section 126a generates a superblock from the physical layer data of 65-bit form, and then sends the generated superblock to the network interface section 130a.

Then, the network interface section 130a generates a GFP frame from the superblock, and then transmits the GFP frame through the network interface optical module section 140a to the WDM transmission device 100b.

After the GFP frame is transmitted from the WDM transmission device 100a via the WDM network 30, in the WDM transmission device 100b, the network interface section 130b receives the GFP frame via the network interface optical module section 140b, and then sends the received GFP frame to the client interface section 120b.

Then, in the client interface section 120b, the superblock generation recognition section 126b extracts the superblock from the GFP frame. Then, the 64B/65B encoding section 125b extracts the superblock from the physical layer data of 65-bit form, and then sends the extracted physical layer data to the padding signal removal section 127b.

The padding signal removal section 127b removes the padding signal inserted in the sent physical layer data so as to restore the physical layer data into the form before the padding signal is inserted, and then writes the restored physical layer data into the clock conversion FIFO 123b by using a clock.

Then, on the other hand, the padding signal rate calculation section 129b calculates the insertion rate of padding signals inserted into the physical layer data having reached the padding signal removal section 127b. Then, in accordance with the insertion rate calculated by the padding signal rate calculation section 129b, the frequency synchronization control section 12Ab controls the voltage controlled oscillator 12Bb so as to change the frequency of the clock used as a reference in transmitting the physical layer data (see FIG. 2).

Here, in the physical layer data having reached the padding signal removal section 127b, padding signals are inserted independently of the frequency deviation. Thus, when the frequency is changed in accordance with the insertion rate of padding signals, the clock on the client side is restored. That is, in this case, the clock used as a reference in transmitting the physical layer data synchronizes with the clock on the client side.

After that, in synchronization with the clock whose frequency has been changed by the frequency synchronization control section 12Ab, the rate adaptation section 128b reads the physical layer data from the clock conversion FIFO 123b, and then performs rate adaptation. Then, the code synchronization section 122b reads the physical layer data from the rate adaptation FIFO of the rate adaptation section 128b, and then performs synchronization on the basis of the idle code contained in the read-out physical layer data. Then, the data extraction section 121b converts the physical layer data from an 8-bit form into a 10-bit form, and then transmits the converted physical layer data through the client interface optical module section 110b to the client network 20b side.

As described above, in the Embodiment 1, in the WDM transmission device 100, when the physical layer data received from the client side is to be transmitted to the WDM network 30 side, the padding signal insertion section 124 inserts, into the physical layer data, padding signals in an amount corresponding to the rate difference between the clock on the client side and the clock in the WDM transmission device 100 faster than the former clock. Then, when the physical layer data received from another WDM transmission device connected to the WDM network 30 side is to be transmitted to the client side, the padding signal rate calculation section 129, the frequency synchronization control section 12A, and the voltage controlled oscillator 12B perform control on the basis of the insertion rate of padding signals inserted into the physical layer data, such that the clock to be used as a reference in transmitting the physical layer data should synchronize with the clock having been used as a reference in transmitting the physical layer data. Thus, the bandwidth of the physical layer data is equilibrated so that the occurrence of frame discard is avoided on the destination client side. Accordingly, the physical layer data can be transferred transparently.

Meanwhile, Embodiment 1 given above has been described for the case that the clock to be used as a reference in transmitting client data is synchronized with the clock used as a reference when the client data has been transmitted, so that the bandwidth of the client data is equilibrated. However, the invention is not limited to this. For example, inter frame gaps contained in the client data may be equalized so that the bandwidth of the client data may be equilibrated. This case is treated in Embodiment 2 given below.

Figure 4:
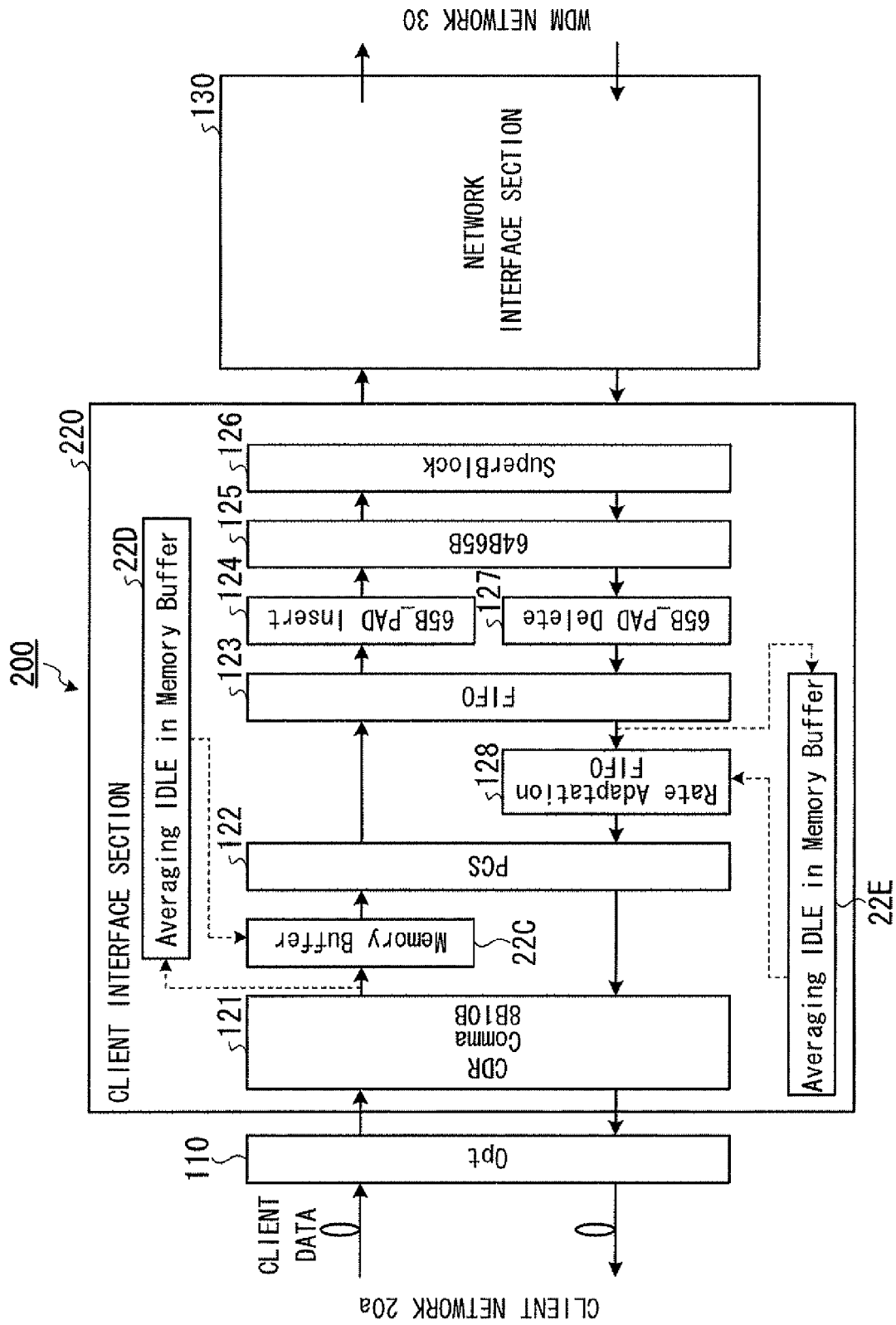
FIG. 4 is a diagram showing a configuration of a WDM transmission device according to Embodiment 2 of the invention.

First, the configuration of a WDM transmission device according to the Embodiment 2 is described below. FIG. 4 is a diagram showing a configuration of a WDM transmission device according to the Embodiment 2. Here, for ease of description, functional sections that play similar roles to those of individual sections in the embodiment described above are designated by like numerals, and hence their detailed description is omitted.

As shown in this figure, the WDM transmission device 200 has a client interface optical module section (Opt) 110, a client interface section 220, a network interface section 130, and a network interface optical module section (not shown).

The client interface section 220 is a processing section that has a FIFO for accumulating client signals and encodes the client signals according to an 8B/10B encoding system. The client interface section 220 has a data extraction section (CDR/Comma/8B10B) 121, a code synchronization section (PCS) 122, a clock conversion FIFO (FIFO) 123, a padding signal insertion section 124, a 64B/65B encoding section (64B65B) 125, a superblock generation recognition section (SuperBlock) 126, a padding signal removal section (65B_PAD Delete) 127, a rate adaptation section (Rate Adaptation/FIFO) 128, a memory buffer section (Memory Buffer) 22C, and inter frame gap equalization processing sections (Averaging IDLE in Memory Buffer) 22D and 22E.

Here, the flow of physical layer data is described below. Physical layer data transmitted from the client side is transferred to the WDM network 30 side via the client interface optical module section 110, the data extraction section 121, the memory buffer section 22C, the code synchronization section 122, the clock conversion FIFO 123, the padding signal insertion section (65B_PAD Insert) 124, the 64B/65B encoding section 125, the superblock generation recognition section 126, and the network interface section 130 in this order.

On the other hand, physical layer data transmitted from the WDM network 30 side is transferred to the client side via individual sections including the network interface section 130, the superblock generation recognition section 126, the padding signal removal section 127, the clock conversion FIFO 123, the rate adaptation section 128, the code synchronization section 122, and the data extraction section 121 in this order.

Then, in the Embodiment 2, in this WDM transmission device 200, the memory buffer section 22C and the inter frame gap equalization processing section 22D perform inter frame gap equalization on the physical layer data transmitted from the client network 20a side to the WDM network 30 side, while the inter frame gap equalization processing section 22E performs inter frame gap equalization on the physical layer data transmitted from the WDM network 30 side to the client side.

The individual functional sections are described below in detail.

The memory buffer section 22C is a buffer for storing all of frames and inter frame gaps in the physical layer data sent from the data extraction section 121.

Figure 5:
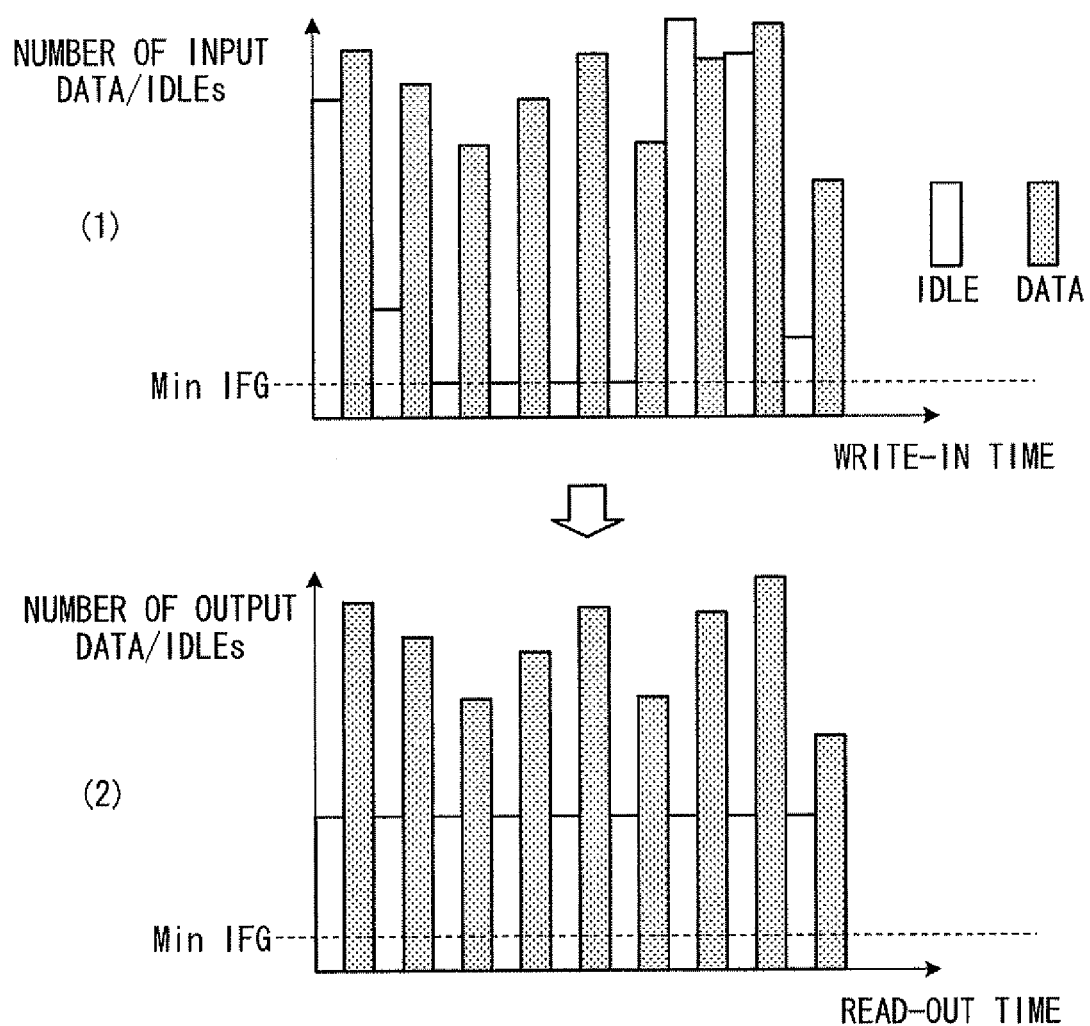
FIG. 5 is a diagram showing equalization for inter frame gaps performed by an inter frame gap equalization processing section.

The inter frame gap equalization processing section 22D is a processing section for equalizing inter frame gaps in the physical layer data stored in the memory buffer section 22C. FIG. 5 is a diagram showing equalization for inter frame gaps performed by an inter frame gap equalization processing section 22D. The inter frame gap equalization performed by the inter frame gap equalization processing section 22D is described below in detail with reference to this figure.

Part (1) of the figure shows a number of frame data (DATA) pieces contained in the frames of the physical layer data stored in the memory buffer section 22C and a number of idle codes (IDLE) contained in the inter frame gaps. The frame data and the idle code described here are 8-bit data generated by conversion by the data extraction section 121.

The inter frame gap equalization processing section 22D, first, calculates the total number of idle codes contained in all inter frame gaps stored in the memory buffer section 22C, and then divides the calculated total by the number of inter frame gaps so as to obtain an average value of the number of idle codes.

After that, as shown in part (2) of the figure, the inter frame gap equalization processing section 22D sets up a reading address for each inter frame gap into the memory buffer section 22C such that the number of idle codes contained in each inter frame gap should be equal to the average value. As a result, when the frames and the inter frame gaps are successively read from the memory buffer section 22C, the sizes of the individual inter frame gaps become equal.

The inter frame gap equalization processing section 22E is a processing section for equalizing the inter frame gaps contained in the physical layer data stored in the rate adaptation FIFO of the rate adaptation section 128.

Specifically, similarly to the inter frame gap equalization processing section 22D, the inter frame gap equalization processing section 22E performs inter frame gap equalization on the inter frame gaps in the physical layer data stored in the rate adaptation FIFO of the rate adaptation section 128.

Here, at the time of the inter frame gap equalization, in the case that insertion or deletion of an inter frame gap has been performed using rate adaptation by the rate adaptation section 128, the inter frame gap equalization processing section 22E performs the equalization on the data having undergone the insertion and the deletion.

As such, when the inter frame gap equalization processing sections 22D and 22E equalize the inter frame gaps contained in the physical layer data, the transmissivity of the client signal according to an 8B/10B encoding system is maintained. Further, margin for the inter frame gaps is ensured.

Figure 6:
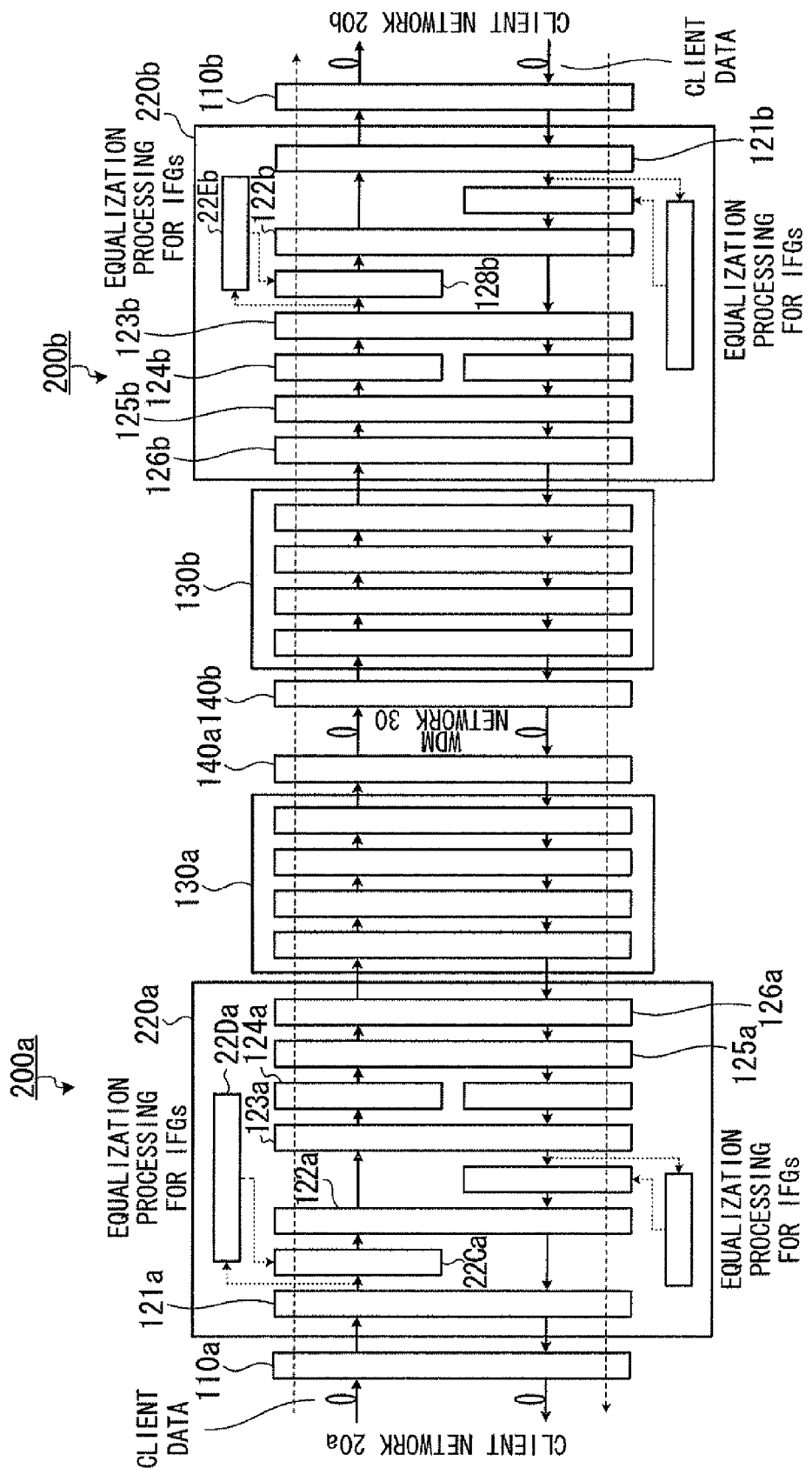
FIG. 6 is a diagram describing a flow of bandwidth control performed by WDM transmission devices according to Embodiment 2 of the invention.

Next, the flow of bandwidth control performed by the WDM transmission devices 200 according to the Embodiment 2 is described below. FIG. 6 is a diagram describing the flow of bandwidth control performed by the WDM transmission devices according to the Embodiment 2. Each of the WDM transmission devices 200a and 200b shown in this figure has a configuration similar to that of the WDM transmission device 200 shown in FIG. 4.

The WDM transmission devices 200a and 200b are connected to each other via the WDM network 30. Further, the WDM transmission device 200a is connected to the client network 20a, while the WDM transmission device 200b is connected to the client network 20b.

The following description is given for a case that the WDM transmission devices 200a and 200b respectively transfers and receives physical layer data transmitted from the client network 20a side to the client network 20b side.

First, in the WDM transmission device 200a, when physical layer data is transmitted from the client network 20a side, the client interface optical module section 110a receives the physical layer data, and then sends the received physical layer data to the client interface section 220a.

Then, in the client interface section 220a, the data extraction section 121a converts the physical layer data from a 10-bit form into an 8-bit form, and then writes the converted physical layer data into the memory buffer section 22Ca.

On the other hand, the inter frame gap equalization processing section 22Da performs inter frame gap equalization on the physical layer data stored in the memory buffer section 22Ca.

Then, the code synchronization section 122a reads from the memory buffer section 22Ca the physical layer data whose inter frame gaps have been equalized, and then writes the physical layer data into the clock conversion FIFO 123a in synchronization with the clock on the client network 20a side.

After that, the padding signal insertion section 124a reads the physical layer data from the clock conversion FIFO 123a, and then sends the read-out physical layer data to the 64B/65B encoding section 125a. Here, when the amount of data in the clock conversion FIFO 123a goes below or is at a predetermined threshold value, the padding signal insertion section 124a inserts a padding signal into the frame of physical layer data, and then sends the physical layer data to the 64B/65B encoding section 125a.

Then, the 64B/65B encoding section 125a converts the physical layer data into a 65-bit form. Then, the superblock generation recognition section 126a generates a superblock from the physical layer data of 65-bit form, and then sends the generated superblock to the network interface section 130a.

Then, the network interface section 130a generates a GFP frame from the superblock, and then transmits the GFP frame through the network interface optical module section 140a to the WDM transmission device 200b.

After the GFP frame is transmitted from the WDM transmission device 200a via the WDM network 30, in the WDM transmission device 200b, the network interface section 130b receives the GFP frame via the network interface optical module section 140b, and then sends the received GFP frame to the client interface section 220b.

Then, in the client interface section 220b, the superblock generation recognition section 126b extracts the superblock from the GFP frame. Then, the 64B/65B encoding section 125b extracts the superblock from the physical layer data of 65-bit form, and then sends the extracted physical layer data to the padding signal removal section 127b.

The padding signal removal section 127b removes the padding signal inserted in the sent physical layer data so as to restore the physical layer data into the form before the padding signal is inserted, and then writes the restored physical layer data into the clock conversion FIFO 123a by using a clock.

After that, the rate adaptation section 128b reads the physical layer data from the clock conversion FIFO 123a, and then performs rate adaptation.

At the same time, the inter frame gap equalization processing section 22Eb performs inter frame gap equalization on the physical layer data stored in the rate adaptation FIFO of the rate adaptation section 128b.

Then, the code synchronization section 122b reads from the rate adaptation FIFO of the rate adaptation section 128b the physical layer data whose inter frame gaps have been equalized, and then performs synchronization on the basis of the idle code contained in the read-out physical layer data. Then, the data extraction section 121b converts the physical layer data from an 8-bit form into a 10-bit form, and then transmits the converted physical layer data through the client interface optical module section 110b to the client network 20b side.

As described above, in the Embodiment 2, the memory buffer section 22C for accumulating the physical layer data received from the client side is provided. Then, the inter frame gap equalization processing section 22D calculates the average value of the sizes of the inter frame gaps contained in the physical layer data accumulated in the memory buffer section 22C, and then equalizes the sizes of the individual inter frame gaps on the basis of the calculated average value. By virtue of this, the bandwidth is equilibrated in the physical layer data transmitted from the client side to the WDM network 30 side.

Further, in the Embodiment 2, the rate adaptation section 128 has a rate adaptation FIFO for accumulating the physical layer data to be transmitted to the client side. Then, the inter frame gap equalization processing section 22E calculates the average value of the sizes of the inter frame gaps contained in the physical layer data accumulated in the rate adaptation FIFO, and then equalizes or adjusts the sizes of the individual inter frame gaps on the basis of the calculated average value. By virtue of this, the bandwidth is equilibrated in the physical layer data transmitted from the WDM network 30 side to the client side.

Meanwhile Embodiment 2 given above has been described for the case that inter frame gaps contained in client data are equalized so that the bandwidth of the client data is equilibrated. However, the invention is not limited to this. For example, an idle code may be additionally inserted into each inter frame gap having a size smaller than or equal to the average value so that the size may be expanded. By virtue of this, the limit of the minimum value for the inter frame gap is satisfied and still the bandwidth of the client data is equilibrated. This case is treated in Embodiment 3 given below.

Figure 7:
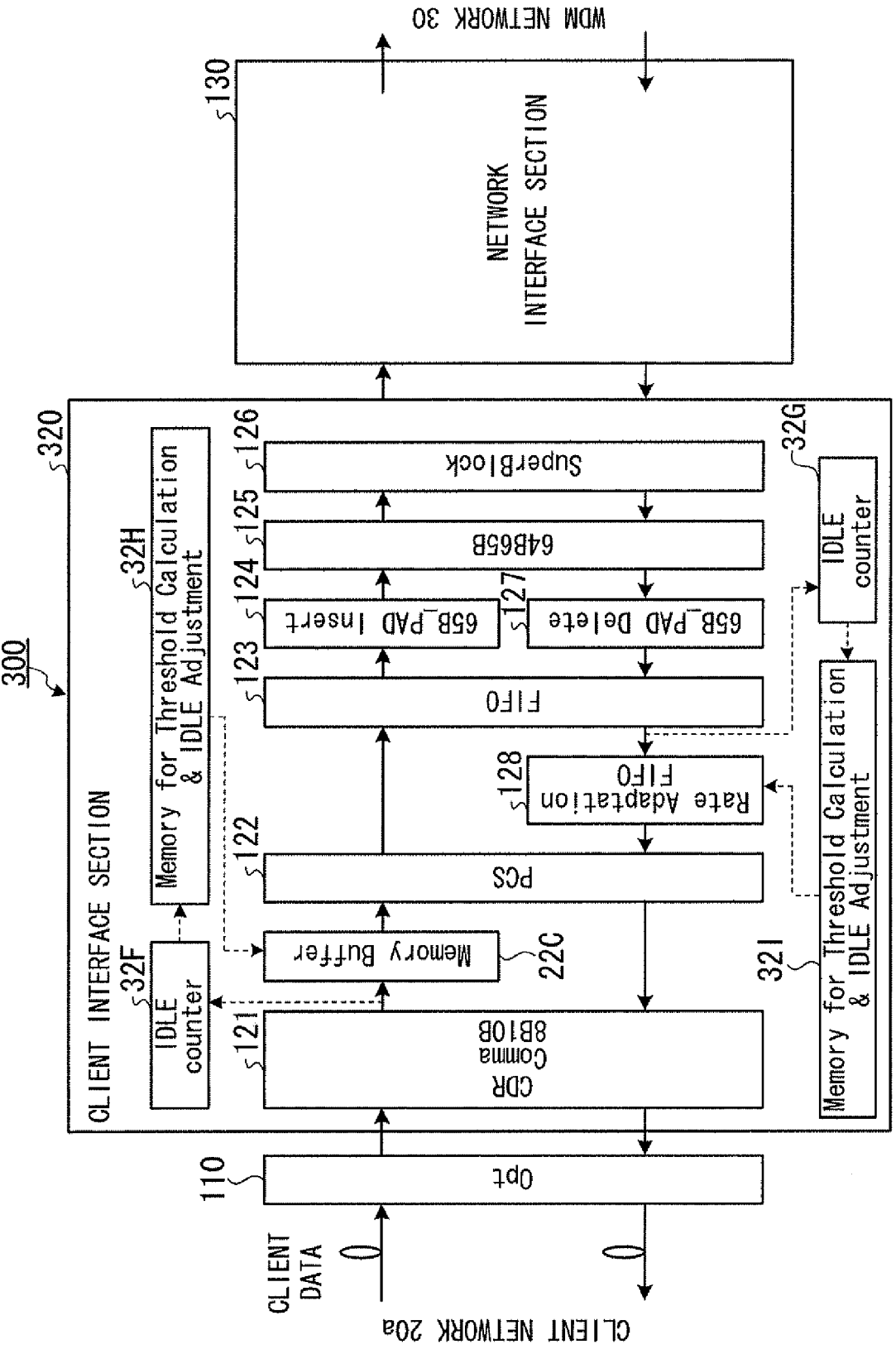
FIG. 7 is a diagram showing a configuration of a WDM transmission device according to Embodiment 3 of the invention.

First, the configuration of a WDM transmission device according to the Embodiment 3 is described below. FIG. 7 is a diagram showing the configuration of a WDM transmission device according to the Embodiment 3. Here, for simplicity of description, functional sections that play similar roles to those of individual sections in the embodiment described above are designated by like numerals, and hence their detailed description is omitted.

As shown in this figure, the WDM transmission device 300 has a client interface optical module section (Opt) 110, a client interface section 320, a network interface section 130, and a network interface optical module section (not shown).

The client interface section 320 is a processing section that has a FIFO for accumulating client signals and encodes the client signals according to an 8B/10B encoding system The client interface section 320 has a data extraction section (CDR/Comma/8B10B) 121, a code synchronization section (PCS) 122, a clock conversion FIFO (FIFO) 123, a padding signal insertion section 124, a 64B/65B encoding section (64B65B) 125, a superblock generation recognition section (SuperBlock) 126, a padding signal removal section (65B_PAD Delete) 127, a rate adaptation section (Rate Adaptation/FIFO) 128, a memory buffer section (Memory Buffer) 22C, idle code counter sections (IDLE counter) 32F and 32G, and idle code optimization sections (Memory for Threshold Calculation & IDLE Adjustment) 32H and 32I.

The flow of physical layer data is similar to that shown in FIG. 4.

Then, in the Embodiment 3, in this WDM transmission device 300, the idle code counter section 32F and the idle code optimization section 32H perform inter frame gap equilibration on the physical layer data transmitted from the client network 20a side to the WDM network 30 side, while the idle code counter section 32G and the idle code optimization section 32I perform inter frame gap equilibration on the physical layer data transmitted from the WDM network 30 side to the client side.

The individual functional sections are described below in detail.

The idle code counter section 32F is a processing section for counting the number of idle codes contained in the inter frame gaps in the physical layer data stored in the memory buffer section 22C.

The idle code counter section 32F is a processing section for counting the number of idle codes contained in the physical layer data stored in the rate adaptation FIFO of the rate adaptation section 128.

The idle code optimization section 32H is a processing section for calculating an optimal value for the number of idle codes on the basis of the number of idle codes counted by the idle code counter section 32F, and thereby equilibrating inter frame gaps contained in the physical layer data stored in the memory buffer section 22C. This idle code optimization section 32H has an internal memory for holding the number of idle codes counted for each inter frame.

Figure 8:
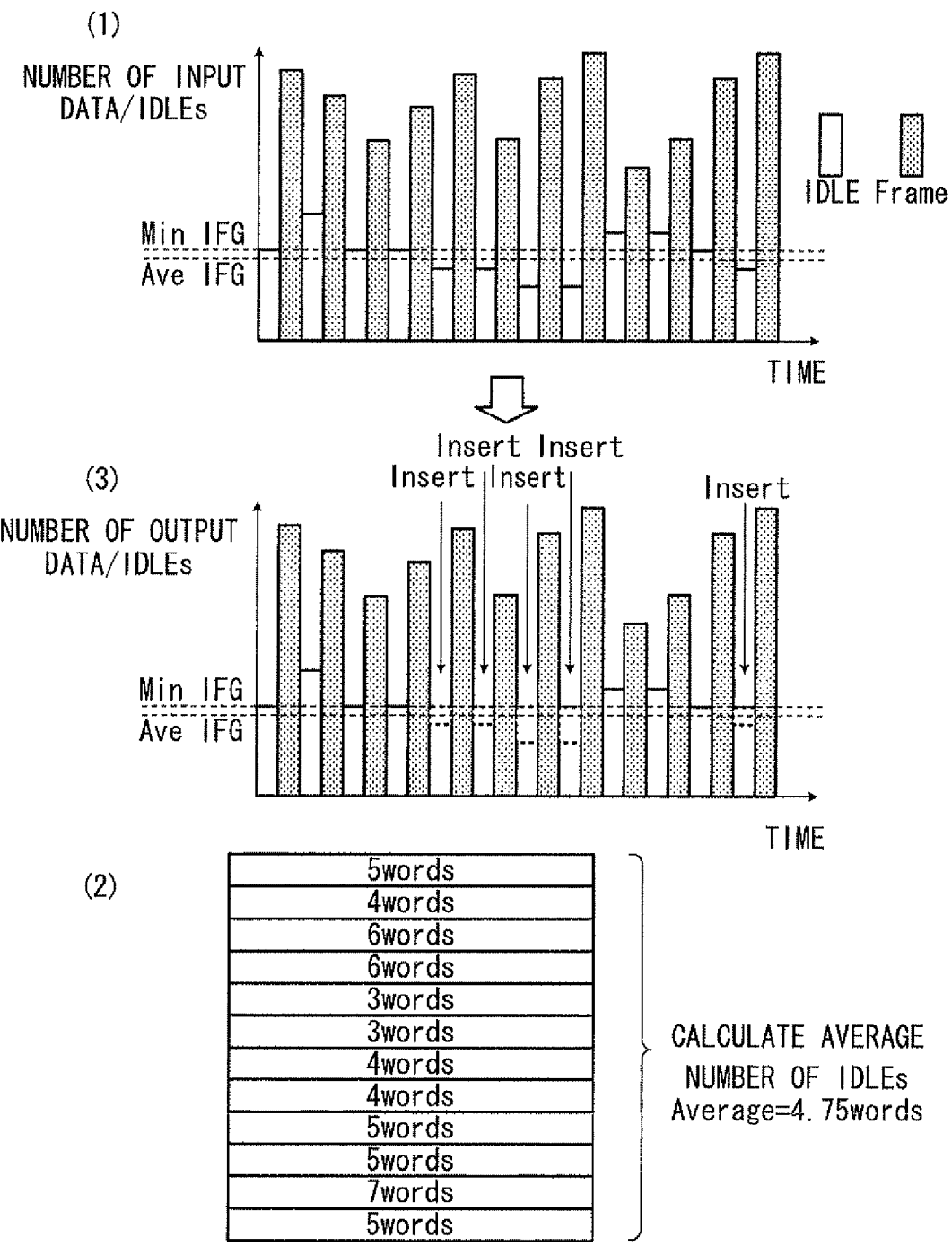
FIG. 8 is a diagram showing equilibration for inter frame gaps performed by an idle code optimization section.

FIG. 8 is a diagram showing equilibration for inter frame gaps performed by an idle code optimization section 32H. The equilibration for inter frame gaps performed by the idle code optimization section 32H is described below in detail with reference to this figure.

Part (1) of the figure shows the number of frame data (DATA) pieces contained in the frames of the physical layer data stored in the memory buffer section 22C as well as the number of idle codes (IDLE) contained in the inter frame gaps. The frame data and the idle code described here are 8-bit data generated by conversion by the data extraction section 121.

As shown in part (2) of the figure, the idle code optimization section 32H stores the number of idle codes counted by the idle code counter section 32F within a predetermined time period, for each inter frame gap into an internal memory, and then calculates the average value of the number of idle codes.

Then, the idle code optimization section 32H checks the number of idle codes in each inter frame gap in the physical layer data stored in the memory buffer section 22C. Then, in the case of presence of an inter frame gap whose number of idle codes is smaller than or equal to the average value, as shown in part (3) of the figure, the idle code optimization section 32H sets up a reading address for each inter frame gap into the memory buffer section 22C such that idle codes should be additionally inserted into the inter frame until the inter frame gap exceeds the minimum size set forth for each client signal according to an 8B/10B encoding system.

On the other hand, in the case of presence of an inter frame gap that has the number of idle codes exceeding the average value and that has a size greater than the minimum size of inter frame gap set forth for each client signal according to an 8B/10B encoding system, the idle code optimization section 32H sets up a reading address for each inter frame gap into the memory buffer section 22C such that idle codes should be deleted from the inter frame until the size of the inter frame becomes closest to the minimum size. Here, at that time, set-up of the reading address by the idle code optimization section 32H is performed such that the size of the inter frame should not become smaller than the minimum size.

Thus, when the frames and the inter frame gaps are successively read from the memory buffer section 22C, equilibration is achieved in such a manner that the size of each inter frame gap is equal to the minimum size of inter frame gap set forth for each client signal according to an 8B/10B encoding system, or alternatively to a size exceeding this minimum size.

The idle code optimization section 32I is a processing section for calculating an optimal value for the number of idle codes on the basis of the number of idle codes counted by the idle code counter section 32G, and then equilibrating the inter frame gaps contained in the physical layer data stored in the rate adaptation FIFO of the rate adaptation section 128. This idle code optimization section 32I has an internal memory for holding the number of idle codes counted for each inter frame.

Similarly to the idle code optimization section 32H, the idle code optimization section 32I performs inter frame gap equilibration on the inter frame gaps in the physical layer data stored in the rate adaptation FIFO of the rate adaptation section 128.

As such, when the idle code optimization sections 32H and 32I equilibrate the inter frame gaps contained in the physical layer data, the transmissivity of the client signal according to an 8B/10B encoding system is maintained. Further, margin for the inter frame gaps is ensured.

Further, in this example, in the case of presence of an inter frame gap that has the number of idle codes exceeding the average value and that has a size greater than the minimum size set forth, the idle code optimization section 32H has set up the reading address such that idle codes should be deleted from the inter frame until the size of the inter frame becomes closest to the minimum size. However, the problem of frame discard arises only in the case of presence of an inter frame gap having a size smaller than the minimum value. Accordingly, as for an inter frame gap exceeding the minimum size, it is not necessary that idle codes are deleted until the size becomes closest to the minimum size. That is, it is sufficient that at least one or more idle codes are deleted.

Figure 9:
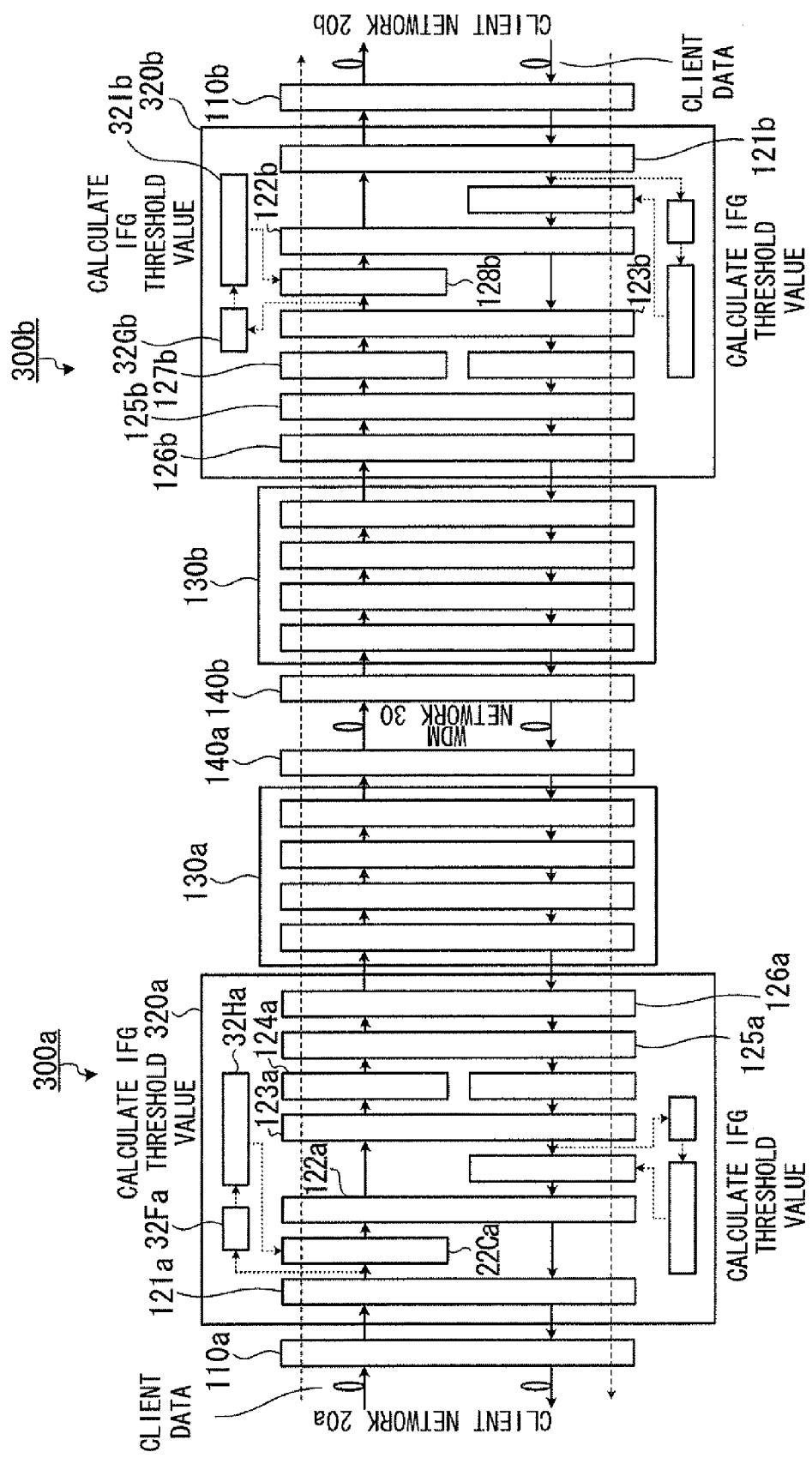
FIG. 9 is a diagram describing a flow of bandwidth control performed by WDM transmission devices according to Embodiment 3 of the invention.

Next, the flow of bandwidth control performed by the WDM transmission devices 300 according to the Embodiment 3 is described below. FIG. 9 is a diagram describing the flow of bandwidth control performed by the WDM transmission devices according to the Embodiment 3. Each of the WDM transmission devices 300a and 300b shown in this figure has a configuration similar to that of the WDM transmission device 300 shown in FIG. 7.

The WDM transmission devices 300a and 300b are connected to each other via the WDM network 30. Further, the WDM transmission device 300a is connected to the client network 20a, while the WDM transmission device 300b is connected to the client network 20b.

The following description is given for a case that the WDM transmission devices 300a and 300b respectively transfers and receives physical layer data transmitted from the client network 20a side to the client network 20b.

First, in the WDM transmission device 300a, when physical layer data is transmitted from the client network 20a side, the client interface optical module section 110a receives the physical layer data, and then sends the received physical layer data to the client interface section 320a.

Then, in the client interface section 320a, the data extraction section 121a converts the physical layer data from a 10-bit form into an 8-bit form, and then writes the converted physical layer data into the memory buffer section 22Ca.

On the other hand, the idle code counter section 32Fa counts the number of idle codes contained in the inter frame gaps in the physical layer data stored in the memory buffer section 22Ca. Then, the idle code optimization section 32Ha calculates an optimal value for the number of idle codes on the basis of the number of idle codes counted by the idle code counter section 32Fa, and then performs inter frame gap equilibration on the physical layer data stored in the memory buffer section 22Ca.

Then, the code synchronization section 122a reads from the memory buffer section 22Ca the physical layer data whose inter frame gaps have been equilibrated, and then writes the physical layer data into the clock conversion FIFO 123a in synchronization with the clock on the client network 20a side.

After that, the padding signal insertion section 124a reads the physical layer data from the clock conversion FIFO 123a, and then sends the read-out physical layer data to the 64B/65B encoding section 125a. Here, when the amount of data in the clock conversion FIFO 123a goes below or at a predetermined threshold value, the padding signal insertion section 124a inserts a padding signal into the frame of physical layer data, and then sends the physical layer data to the 64B/65B encoding section 125a.

Then, the 64B/65B encoding section 125a converts the physical layer data into a 65-bit form. Then, the superblock generation recognition section 126a generates a superblock from the physical layer data of 65-bit form, and then sends the generated superblock to the network interface section 130a.

Then, the network interface section 130a generates a GFP frame from the superblock, and then transmits the GFP frame through the network interface optical module section 140a to the WDM transmission device 300b.

After the GFP frame is transmitted from the WDM transmission device 300a via the WDM network 30, in the WDM transmission device 300b, the network interface section 130b receives the GFP frame via the network interface optical module section 140b, and then sends the received GFP frame to the client interface section 320b.

Then, in the client interface section 320b, the superblock generation recognition section 126b extracts the superblock from the GFP frame. Then, the 64B/65B encoding section 125b extracts the superblock from the physical layer data of 65-bit form, and then sends the extracted physical layer data to the padding signal removal section 127b.

The padding signal removal section 127b removes the padding signal inserted in the sent physical layer data so as to restore the physical layer data into the form before the padding signal is inserted, and then writes the restored physical layer data into the clock conversion FIFO 123a by using a clock.

After that, the rate adaptation section 128b reads the physical layer data from the clock conversion FIFO 123a, and then performs rate adaptation.

At the same time, the idle code counter section 32Gb counts the number of idle codes contained in the inter frame gaps in the physical layer data stored in the rate adaptation FIFO of the rate adaptation section 128b. Then, the idle code optimization section 32Ib calculates an optimal value for the number of idle codes on the basis of the number of idle codes counted by the idle code counter section 32Gb, and then performs inter frame gap equilibration on the physical layer data stored in the memory buffer section 22Ca.

Then, the code synchronization section 122b reads from the rate adaptation FIFO of the rate adaptation section 128b the physical layer data whose inter frame gaps have been equalized, and then performs synchronization on the basis of the idle code contained in the read-out physical layer data. Then, the data extraction section 121b converts the physical layer data from an 8-bit form into a 10-bit form, and then transmits the converted physical layer data through the client interface optical module section 110b to the client network 20b side.

As described above, in the Embodiment 3, the memory buffer section 22Ca for accumulating the physical layer data received from the client side is provided. Then, the idle code counter section 32Fa and the idle code optimization section 32Ha calculate the average value of the sizes of the inter frame gaps contained in the physical layer data accumulated in the memory buffer section 220a, and then additionally insert idle codes into each inter frame gap having a size smaller than or equal to the calculated average value so that the size is expanded. By virtue of this, the limit of the minimum value for the inter frame gap is satisfied and still the bandwidth of the physical layer data transmitted to the WDM network 30 side from the client side is equilibrated.

Further, in the Embodiment 3, the rate adaptation section 128b has the rate adaptation FIFO for accumulating the physical layer data to be transmitted to the client side. Then, the idle code counter section 32Gb and the idle code optimization section 32Ib calculate the average value of the sizes of the inter frame gaps contained in the physical layer data accumulated in the rate adaptation FIFO, and then additionally insert idle codes into each inter frame gap having a size smaller than or equal to the calculated average value so that the size is expanded. By virtue of this, the limit of the minimum value for the inter frame gap is satisfied and still the bandwidth is equilibrated in the physical layer data transmitted from the WDM network 30 side to the client side.

Meanwhile, Embodiment 3 given above has been described for the case that an idle code is additionally inserted into each inter frame gap having a size smaller than or equal to the average value so that the size is expanded, so that the limit of the minimum value for the inter frame gap is satisfied and still the bandwidth of the client data is equilibrated. However, the invention is not limited to this. For example, when the inter frame gap exceeds a predetermined threshold value, the inter frame gap may be reduced into a predetermined minimum value so that overflow may be prevented in the clock conversion FIFO and still the bandwidth of the client data may be also equilibrated. This case is treated in Embodiment 4 given below.

Figure 10:
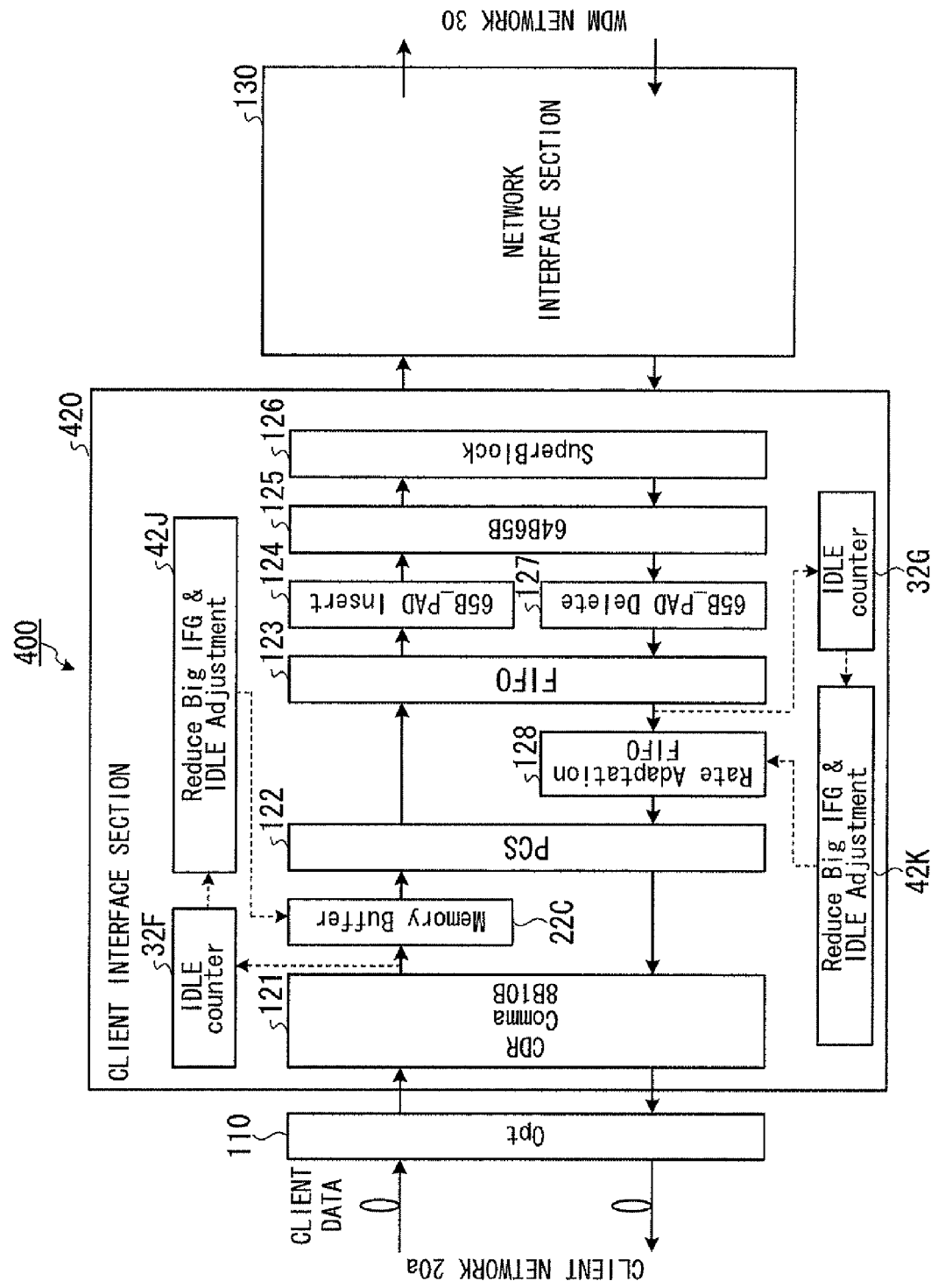
FIG. 10 is a diagram showing a configuration of a WDM transmission device according to Embodiment 4 of the invention.

First, the configuration of a WDM transmission device according to the Embodiment 4 is described below. FIG. 10 is a diagram showing the configuration of a WDM transmission device according to the Embodiment 4. Here, for ease of description, functional sections that play similar roles to those of individual sections in the embodiment described above are designated by like numerals, and hence their detailed description is omitted.

As shown in this figure, the WDM transmission device 400 has a client interface optical module section (Opt) 110, a client interface section 420, a network interface section 130, and a network interface optical module section (not shown).

The client interface section 420 is a processing section that has a FIFO for accumulating client signals and encodes the client signals according to an 8B/10B encoding system. The client interface section 420 has a data extraction section (CDR/Comma/8B10B) 121, a code synchronization section (PCS) 122, a clock conversion FIFO (FIFO) 123, a padding signal insertion section 124, a 64B/65B encoding section (64B65B) 125, a superblock generation recognition section (SuperBlock) 126, a padding signal removal section (65B_PAD Delete) 127, a rate adaptation section (Rate Adaptation/FIFO) 128, a memory buffer section (Memory Buffer) 22C, idle code counter sections (IDLE counter) 32F and 32G, and idle code reduction sections (Reduce Big IFG & IDLE Adjustment) 42J and 42K.

The flow of physical layer data is similar to that shown in FIG. 4.

Then, in the Embodiment 4, in the WDM transmission device 400, the idle code reduction section 42J reduces idle codes in the inter frame gaps contained in the physical layer data transmitted from the client network 20a side to the WDM network 30 side. Further, the idle code reduction section 42K reduces idle codes in the inter frame gaps contained in the physical layer data transmitted from the WDM network 30 side to the client side. By virtue of this, overflow is prevented in the clock conversion FIFO 123.

Figure 11:
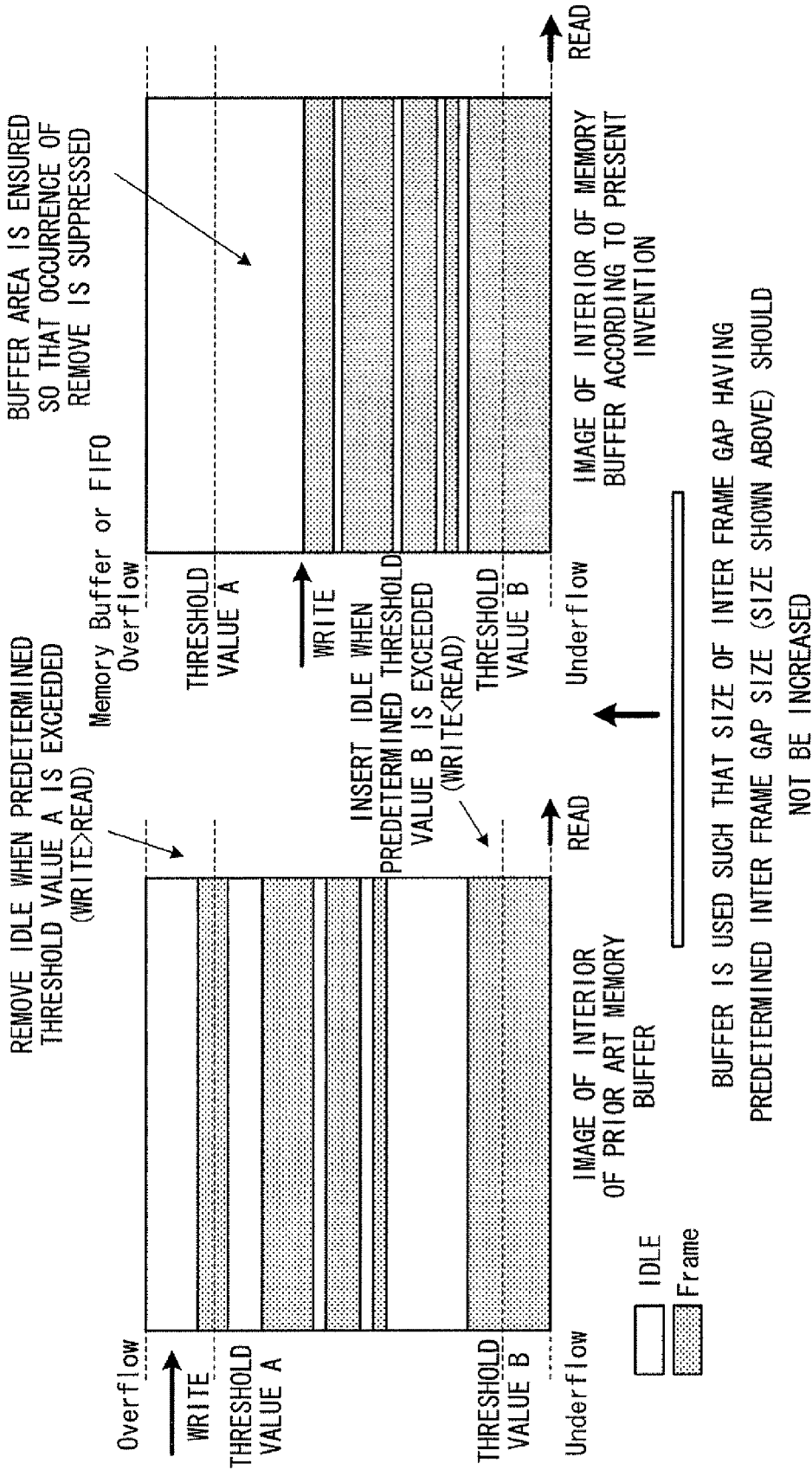
FIGS. 11A and 11B are a diagram showing reduction for idle codes performed by an idle code reduction section.

The idle code reduction section 42J is a processing section for reducing idle codes in the inter frame gaps contained in the physical layer data stored in the memory buffer section 22C. FIG. 11 is a diagram showing the reduction for idle codes performed by the idle code reduction section 42J.

Parts (1) and (2) of the figure show respectively an image of frame data (Frame) contained in the frames of the physical layer data stored in the memory buffer section 22C and an image of inter frame gaps (IFG). Part (1) is an image without the application of the invention, while part (2) is an image with the application of the invention.

On the basis of the number of idle codes counted by the idle code counter section 32F, the idle code reduction section 42J monitors for each inter frame the size of the inter frame gap contained in the physical layer data stored in the memory buffer section 22C. Then, when a frame gap is detected that has a size exceeding a predetermined threshold value, as shown in part (2) of the figure, the idle code reduction section 42J sets up a writing address to be used at the time of writing the inter frame gap into the memory buffer section 22C, such that the size should be reduced into a minimum value defined for each client device employing an 8B/10B encoding system.

Alternatively, for the frame gap having a size exceeding the predetermined threshold value, the idle code reduction section 42J may set up a reading address to be used at the time of reading the inter frame gap from the memory buffer section 22C, such that the size should be reduced into a minimum value defined for each client device employing an 8B/10B encoding system.

Further, after the reduction of an inter frame gap is performed once, the idle code reduction section 42J performs control such that reduction is not performed on subsequent short inter frame gaps.

This reduces the sizes of the inter frame gaps in the physical layer data to be written in the clock conversion FIFO 123, and hence prevents overflow in the clock conversion FIFO 123.

Further, on the other hand, when the amount of data of the physical layer data stored in the memory buffer section 22C goes below or at a predetermined threshold value, the idle code reduction section 42J sets up a writing address or a reading address such that a predetermined number of idle codes are collectively inserted into the frame gap of the physical layer data. This prevents underflow in the memory buffer section 22C.

The idle code reduction section 42K is a processing section for reducing idle codes contained in the physical layer data stored in the rate adaptation FIFO of the rate adaptation section 128.

Similarly to the idle code reduction section 42J, the idle code reduction section 42K performs inter frame gap reduction on the inter frame gaps in the physical layer data stored in the rate adaptation FIFO of the rate adaptation section 128.

Figure 12:
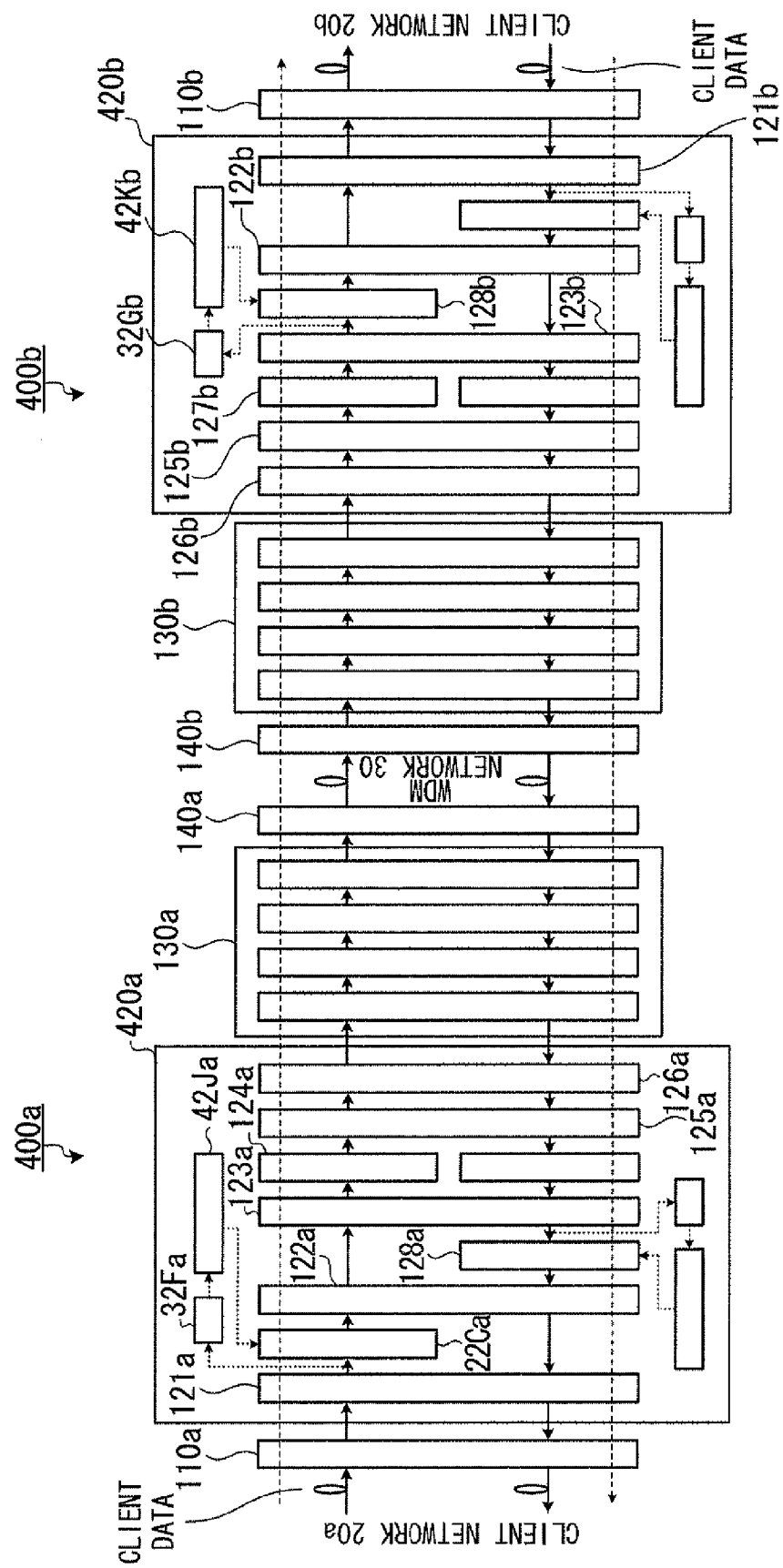
FIG. 12 is a diagram describing a flow of bandwidth control performed by WDM transmission devices according to Embodiment 3 of the invention.

Next, the flow of bandwidth control performed by the WDM transmission devices 400 according to the Embodiment 3 is described below. FIG. 12 is a diagram describing the flow of bandwidth control performed by the WDM transmission devices according to the Embodiment 4. Each of the WDM transmission devices 400a and 400b shown in this figure has a configuration similar to that of the WDM transmission device 400 shown in FIG. 10.

The WDM transmission devices 400a and 400b are connected to each other via the WDM network 30. Further, the WDM transmission device 400a is connected to the client network 20a, while the WDM transmission device 400b is connected to the client network 20b.

The following description is given for a case that the WDM transmission devices 400a and 400b respectively transfers and receives physical layer data transmitted from the client network 20a side to the client network 20b side.

First, in the WDM transmission device 400a, when physical layer data is transmitted from the client network 20a side, the client interface optical module section 110a receives the physical layer data, and then sends the received physical layer data to the client interface section 420a.

Then, in the client interface section 420a, the data extraction section 121a converts the physical layer data from a 10-bit form into an 8-bit form, and then writes the converted physical layer data into the memory buffer section 22Ca.

On the other hand, the idle code counter section 32Fa counts the number of idle codes contained in the inter frame gaps in the physical layer data stored in the memory buffer section 22Ca. Then, on the basis of the number of idle codes counted by the idle code counter section 32Fa, the idle code reduction section 42Ja monitors the sizes of the inter frame gaps, and then reduces inter frame gaps contained in the physical layer data stored in the memory buffer section 22Ca.

Then, the code synchronization section 122a reads from the memory buffer section 22Ca the physical layer data whose inter frame gaps have been equilibrated, and then writes the physical layer data into the clock conversion FIFO 123a in synchronization with the clock on the client network 20a side.

After that, the padding signal insertion section 124a reads the physical layer data from the clock conversion FIFO 123a, and then sends the read-out physical layer data to the 64B/65B encoding section 125a. Here, when the amount of data in the clock conversion FIFO 123a goes below or at a predetermined threshold value, the padding signal insertion section 124a inserts a padding signal into the frame of physical layer data, and then sends the physical layer data to the 64B/65B encoding section 125a.

Then, the 64B/65B encoding section 125a converts the physical layer data into a 65-bit form. Then, the superblock generation recognition section 126*a* generates a superblock from the physical layer data of 65-bit form, and then sends the generated superblock to the network interface section 130*a*.

Then, the network interface section 130*a* generates a GFP frame from the superblock, and then transmits the GFP frame through the network interface optical module section 140*a* to the WDM transmission device 400*b*.

After the GFP frame is transmitted from the WDM transmission device 400*a* via the WDM network 30, in the WDM transmission device 400*b*, the network interface section 130*b* receives the GFP frame via the network interface optical module section 140*b*, and then sends the received GFP frame to the client interface section 420*b*.

Then, in the client interface section 420*b*, the superblock generation recognition section 126*b* extracts the superblock from the GFP frame. Then, the 64B/65B encoding section 125*b* extracts the physical layer data of 65-bit form from the superblock, and then sends the extracted physical layer data to the padding signal removal section 127*b*.

The padding signal removal section 127*b* removes the padding signal inserted in the sent physical layer data so as to restore the physical layer data into the form before the padding signal is inserted, and then writes the restored physical layer data into the clock conversion FIFO 123*b* by using a clock.

After that, the rate adaptation section 128*b* reads the physical layer data from the clock conversion FIFO 123*a*, and then performs rate adaptation.

At the same time, the idle code counter section 32Gb counts the number of idle codes contained in the inter frame gaps in the physical layer data stored in the rate adaptation FIFO of the rate adaptation section 128*b*. Then, on the basis of the number of idle codes counted by the idle code counter section 32Gb, the idle code reduction section 42Kb monitors the sizes of the inter frame gaps, and then reduces inter frame gaps contained in the physical layer data stored in the rate adaptation FIFO of the rate adaptation section 128*b*.

Then, the code synchronization section 122*b* reads from the rate adaptation FIFO of the rate adaptation section 128*b* the physical layer data whose inter frame gaps have been equalized, and then performs synchronization on the basis of the idle code contained in the read-out physical layer data. Then, the data extraction section 121*b* converts the physical layer data from an 8-bit form into a 10-bit form, and then transmits the converted physical layer data through the client interface optical module section 110*b* to the client network 20*b* side.

As described above, in the Embodiment 4, when the size of an inter frame gap contained in the physical layer data received from the client side exceeds a predetermined threshold value, the idle code reduction section 42Ja reduces the inter frame gap into a predetermined minimum value. Thus, overflow is prevented in the clock conversion FIFO, and still the bandwidth is equilibrated in the physical layer data transmitted from the client side to the WDM network 30 side.

Further, in the Embodiment 4, when the size of an inter frame gap contained in the physical layer data to be transmitted to the client side exceeds a predetermined threshold value, the idle code reduction section 42Kb reduces the inter frame gap into a predetermined minimum value. Thus, overflow is prevented in the clock conversion FIFO, and still the bandwidth is equilibrated in the physical layer data transmitted from the WDM network 30 side to the client side.

Figure 15:
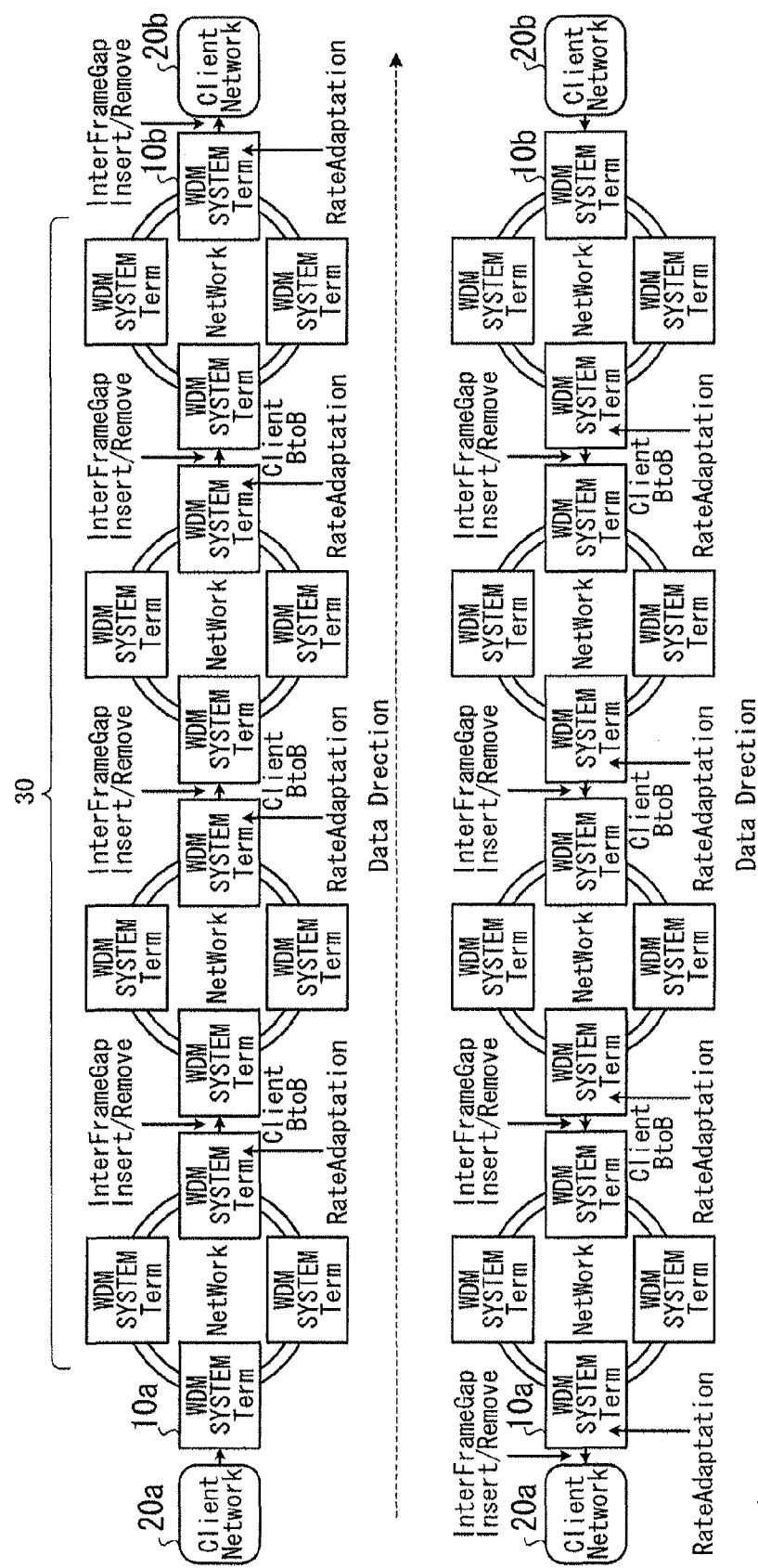
FIG. 15 is part (1) of a diagram describing rate adaptation in a typical optical transmission system.
Figure 16:
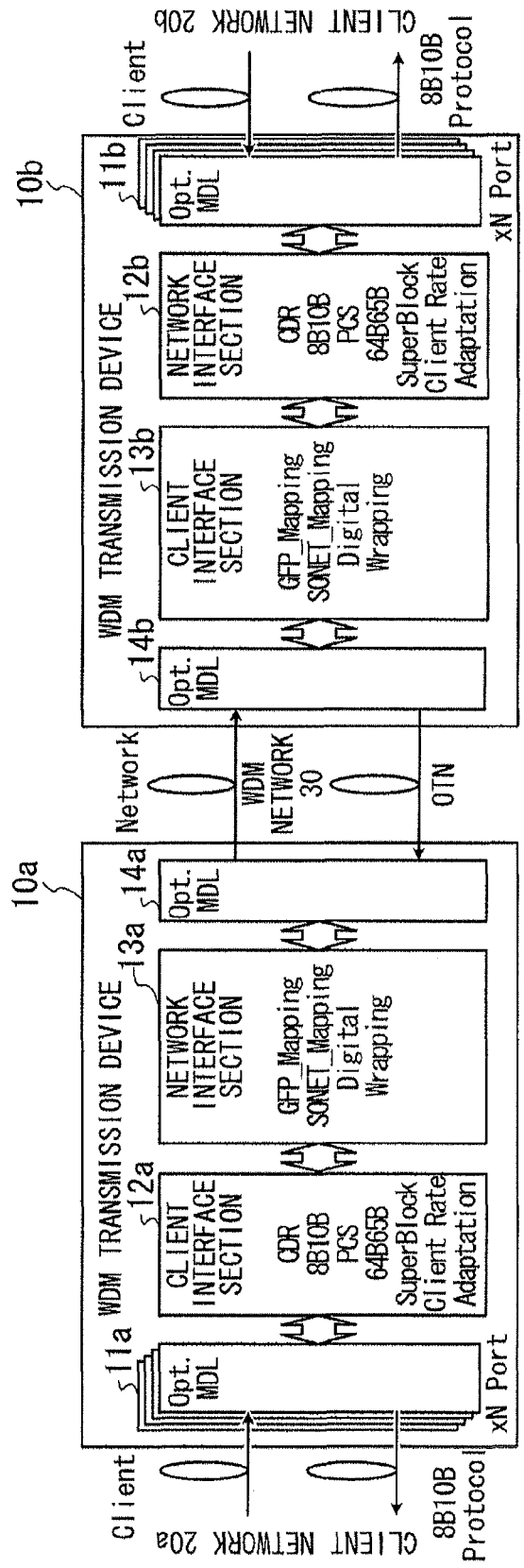
FIG. 16 is part (2) of a diagram describing rate adaptation in a typical optical transmission system.

According to each of the above-mentioned embodiments of the invention, in a network of tandem configuration as shown in FIG. 15, at the time of transparent transfer of a client signal having a frequency deviation, even when the bandwidth is changed in a state that the inter frame gap length is set near the minimum value, transparent transfer is achieved without occurrence of frame discard between client devices at far end. Further, a transparent network can be constructed without a limit in the number of tandem stages.

Further, in the above-mentioned embodiments, even when insertion/deletion of an inter frame gap in physical layer data is performed, frames which constitute original physical layer data to be transparently transferred between the client devices and C1C2 codes for auto-negotiation in the case of GbE are transferred intact. Thus, even when the inter frame gaps are equalized, a transparent network can be constructed.

Further, in the above-mentioned embodiments, the WDM transmission devices 100, 200, 300, and 400 have been described in separate embodiments respectively. However, the invention is not limited to this. That is, a single WDM transmission device may be provided with all functions of the WDM transmission devices 100, 200, 300, and 400, or alternatively a combination of some of them. This permits more efficient equilibration of the bandwidth of client data.

Further, the above-mentioned embodiments have been given for the case of a WDM transmission device. However, when the configuration of the WDM transmission device is implemented by software, a bandwidth control program is obtained that has the similar function. Thus, a computer that executes this bandwidth control program is described below.

Figure 13:
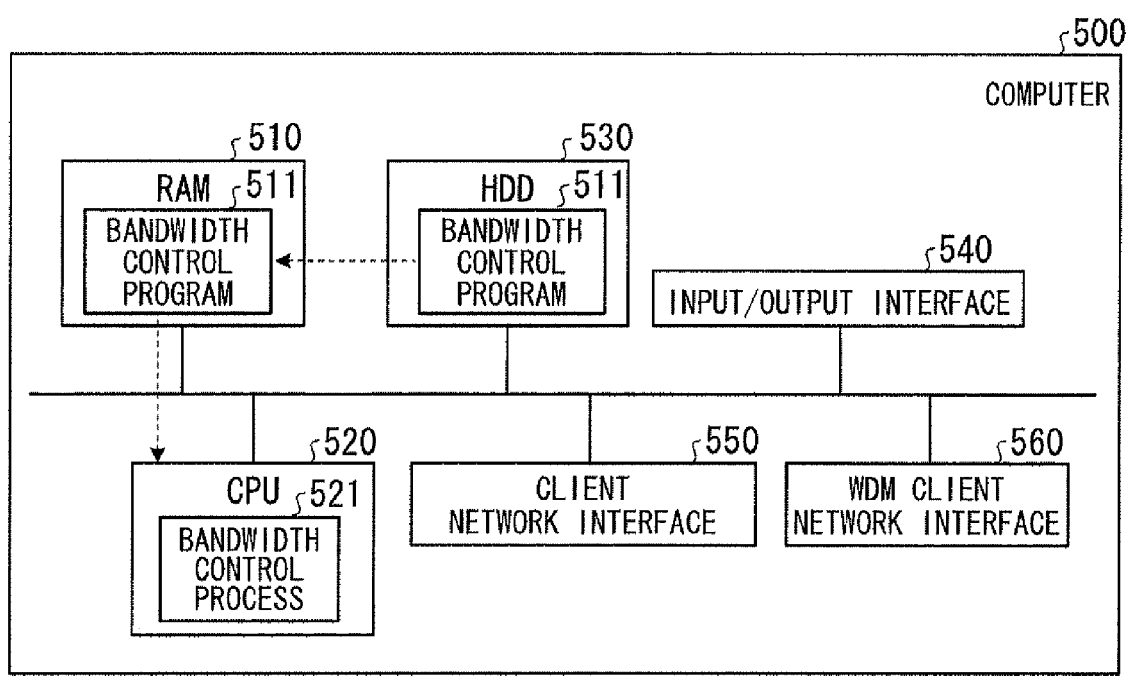
FIG. 13 is a functional block diagram showing a configuration of a computer for executing a bandwidth control program according to an embodiment of the invention.
Figure 14:
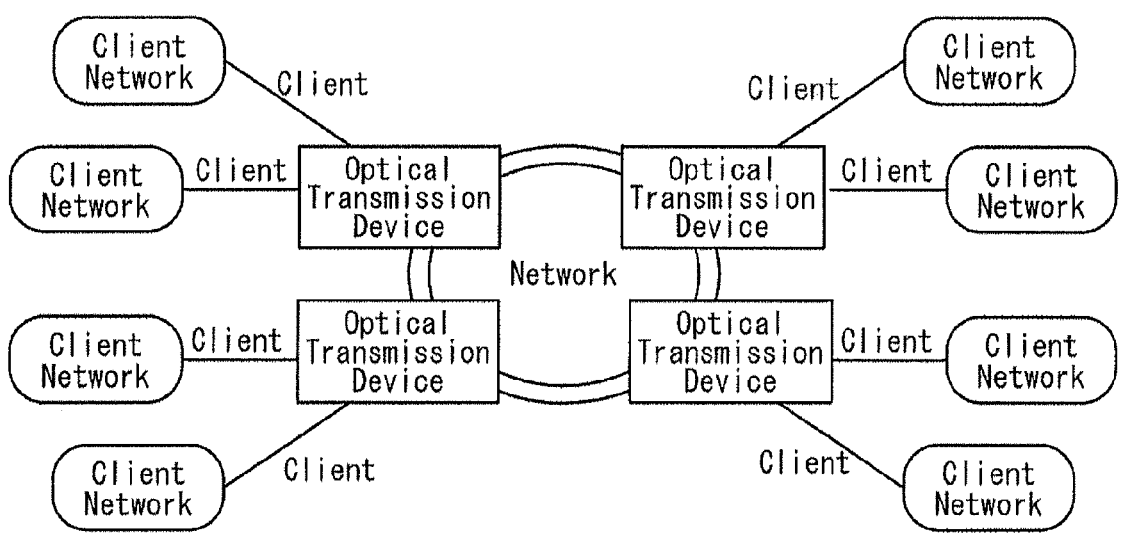
FIG. 14 is a diagram showing an example of a typical optical transmission system.

FIG. 13 is a functional block diagram showing a configuration of a computer for executing a bandwidth control program according to an embodiment of the invention. As shown in this figure, a computer 500 has a RAM (Random Access Memory) 510, a CPU (Central Processing Unit) 520, an HDD (Hard Disk Drive) 530, an input/output interface 540, a client network interface 550, and a WDM network interface 560.

The RAM 510 is a memory for storing programs, intermediate results during program execution, and the like. The CPU 520 is a central processing unit for reading a program from the RAM 510 and then executing it.

The HDD 530 is a disk device for storing programs and data. The input/output interface 540 is an interface for connecting input devices such as a mouse and a keyboard and display devices.

The client network interface 550 is an interface for allowing the computer 500 to connect to client devices via a network. The WDM network interface 560 is an interface for connecting other WDM transmission devices via a network.

Then, a bandwidth control program 511 executed on this computer 500 is stored, for example, in a database in a client device connected through the client network interface 550. This program is read from this database and then installed on the computer 500.

Then, the bandwidth control program 511 having been installed is stored in the HDD 530, then read onto the RAM 510, and then executed as a bandwidth control process 521 by the CPU 520.

Further, among the processing pieces described in the above-mentioned embodiments, all or a part of processing pieces described as performed automatically may be performed manually. Further, all or a part of processing pieces described as performed manually may be performed automatically by a publicly known method.

Further, the processing procedures, the control procedures, the detailed names, and the information including various kinds of data and parameters disclosed in the specification and the drawings given above may arbitrarily be changed unless specially noted.

Further, the individual components of each device shown in the figures are merely a functional concept. Thus, the physical configuration need not exactly be as shown in the figures. That is, the detailed modes of distribution and integration of the individual devices are not limited to those shown in the figures. Thus, all or a part of the components may be distributed and integrated functionally or physically on an arbitrary unit basis in accordance with various kinds of loads, operating conditions, and the like.

Further, all or an arbitrary part of the processing functions performed by each device may be implemented by a CPU and a program analyzed and executed on the CPU, or alternatively may be implemented in the form of hardware of wired logic.

According to each device, when client data received from the client side is to be transmitted to the optical communication network side, padding signals in an amount corresponding to the rate difference between the clock on the client side and the clock on the optical communication network side faster than the former clock are inserted into the client data. Further, when client data received from another optical transmission device connected to the optical communication network side is to be transmitted to the client side, on the basis of the ratio of padding signals having been inserted in the client data, control is performed such that the clock to be used as a reference in transmitting the client data to the client should synchronize with the clock having been used as a reference in transmitting the client data. Thus, an effect is obtained that the bandwidth of the physical layer data is equilibrated so that the physical layer data can be transferred transparently without occurrence of frame discard on the destination client side.

Further, in each device, a receiving-side buffer for accumulating client data received from the client side is provided. Then, the average value is calculated for the sizes of inter frame gaps contained in the client data accumulated in the receiving-side buffer, and then, the sizes of the individual inter frame gaps are equalized on the basis of the calculated average value. Accordingly an effect is obtained that the bandwidth is equilibrated in the physical layer data transmitted from the client side to the WDM network side.

Further, in each device, a transmitting-side buffer for accumulating client data to be transmitted to the client side is provided. Then, the average value is calculated for the sizes of inter frame gaps contained in the client data accumulated in the transmitting-side buffer, and then, the sizes of the individual inter frame gaps are equalized on the basis of the calculated average value. Accordingly, an effect is obtained that the bandwidth is equilibrated in the physical layer data transmitted from the WDM network side to the client side.

Further, in each device, a receiving-side buffer for accumulating client data received from the client side is provided. Then, the average value is calculated for the sizes of inter frame gaps contained in the client data accumulated in the receiving-side buffer, and then idle codes are additionally inserted into each inter frame gap having a size smaller than or equal to the calculated average value so that the size is expanded. Thus, an effect is obtained that the limit of the minimum value for the inter frame gap is satisfied and still the bandwidth is equilibrated in the physical layer data transmitted from the client side to the WDM network side.

Further, in each device, a transmitting-side buffer for accumulating client data to be transmitted to the client side is provided. Then, the average value is calculated for the sizes of inter frame gaps contained in the client data accumulated in the transmitting-side buffer, and then idle codes are additionally inserted into each inter frame gap having a size smaller than or equal to the calculated average value so that the size is expanded. Thus, an effect is obtained that the limit of the minimum value for the inter frame gap is satisfied and still the bandwidth is equilibrated in the physical layer data transmitted from the WDM network side to the client side.

Further, according to each device, when an inter frame gap contained in the client data received from the client side exceeds a predetermined threshold value, the inter frame gap is reduced into a predetermined minimum value. Thus, an effect is obtained that overflow is prevented in the clock conversion FIFO, and still the bandwidth is equilibrated in the physical layer data transmitted from the client side to the WDM network side.

Further, according to each device, when an inter frame gap contained in the client data to be transmitted to the client side exceeds a predetermined threshold value, the inter frame gap is reduced into a predetermined minimum value. Thus, an effect is obtained that overflow is prevented in the clock conversion FIFO, and still the bandwidth is equilibrated in the physical layer data transmitted from the WDM network side to the client side.

As described above, the optical transmission device, the optical transmission system, the bandwidth control method, and the bandwidth control program according to the invention are useful in the case of a transmitted client signal has a frequency deviation. In particular, the invention is suitable for a network constructed from optical transmission devices connected in a tandem configuration.

The order of description of the embodiments isn't meant to show the superiority and inferiority of the different embodiments of the invention. Although a few embodiments of the inventions have been described in detail, it should be understood that the various changes, substitutions, and alterations could be made hereto without depending from the sprit and scope of the invention, the scope of which is defined in the claims and their equivalents.

What is claimed is:

1. An optical transmission device for transmitting client data encoded according to an 8B/10B encoding, between a client side and an optical communication network side, said optical transmission device comprising:
    padding signal insertion means for inserting padding signals in an amount corresponding to a rate difference between a clock on the client side and a clock in the optical transmission device faster than the clock of the client side into the client data when client data received from said client side is to be transmitted to said optical communication network side; and
    clock synchronization means for controlling a clock to be used as a reference in transmitting the client data to synchronize with a clock having been used as a reference in transmitting the client data based on a ratio of the padding signals inserted in the client data when client data received from another optical transmission device connected with said optical communication network side is to be transmitted to said client side.

2. The optical transmission device according to claim 1, further comprising:
    a receiving-side buffer for accumulating the client data received from said client side; and
    receiving-side gap equalization means for calculating an average value of sizes of inter frame gaps contained in the client data accumulated in said receiving-side buffer and equalizing the sizes of individual inter frame gaps based on the calculated average value.

3. The optical transmission device according to claim 1, further comprising:
    a transmitting-side buffer for accumulating client data to be transmitted to said client side; and second gap equalization means for calculating an average value of sizes of inter frame gaps contained in the client data accumulated in said transmitting-side buffer and equalizing the sizes of individual inter frame gaps based on the calculated average value.

4. The optical transmission device according to claim 1, further comprising:
   a receiving-side buffer for accumulating the client data received from said client side; and
   receiving-side gap expansion means for calculating an average value of sizes of inter frame gaps contained in the client data accumulated in said receiving-side buffer, additionally inserting an idle code into each inter frame gap having a size smaller than or equal to the calculated average value, and thereby expanding the size smaller or equal to said average value.

5. The optical transmission device according to claim 1, further comprising:
   a transmitting-side buffer for accumulating client data to be transmitted to said client side; and
   transmitting-side gap expansion means for calculating an average value of sizes of inter frame gaps contained in the client data accumulated in said transmitting-side buffer, additionally inserting an idle code into each inter frame gap having a size smaller than or equal to the calculated average value, and thereby expanding the size smaller or equal to said average value.

6. The optical transmission device according to claim 1, further comprising:
   receiving-side gap reduction means for, when a size of an inter frame gap contained in the client data received from said client side exceeds a predetermined threshold value, reducing the inter frame gap into a predetermined minimum value.

7. The optical transmission device according to claim 1, further comprising:
   transmitting-side gap reduction means for, when a size of an inter frame gap contained in the client data to be transmitted to said client side exceeds a predetermined threshold value, reducing the inter frame gap into a predetermined minimum value.

8. An optical transmission system constructed from optical transmission devices for transmitting client data encoded according to an 8B/10B encoding, between a client side and an optical communication network side, said optical transmission system comprising:
   a padding signal insertion section inserting, into the client data, padding signals in an amount corresponding to a rate difference between a clock on the client side and a clock in the optical transmission device faster than the clock of the client side, when client data received from said client side is to be transmitted from a first optical transmission device to said optical communication network side; and
   a clock synchronization section controlling a clock to be used as a reference in transmitting the client data to synchronize with a clock having been used as a reference in transmitting the client data, based on a ratio of padding signals having been inserted in the client data, when client data received from said first optical transmission device connected with said optical communication network side is to be transmitted from a second optical transmission device to said client side.

9. A bandwidth control method applied to optical transmission devices for transmitting client data encoded according to an 8B/10B encoding, between a client side and an optical communication network side, said bandwidth control method comprising:
   inserting padding signals in an amount corresponding to a rate difference between a clock on the client side and a clock in the optical transmission device faster than the clock of the client side into the client data when client data received from said client side is to be transmitted from a first optical transmission device to said optical communication network side; and
   controlling a clock to be used as a reference in transmitting the client data to synchronize with a clock having been used as a reference in transmitting the client data based on a ratio of padding signals having been inserted in the client data when client data received from said first optical transmission device connected with said optical communication network side is to be transmitted from a second optical transmission device to said client side.

* * * * *